US011240642B2

(12) United States Patent
Ahmad et al.

(10) Patent No.: US 11,240,642 B2
(45) Date of Patent: *Feb. 1, 2022

(54) GROUP COMMUNICATION SERVICE ENABLER (GCSE) GROUP MANAGEMENT

(71) Applicant: InterDigital Patent Holdings, Inc., Wilmington, DE (US)

(72) Inventors: Saad Ahmad, Montreal (CA); Guanzhou Wang, Brossard (CA); Li-Hsiang Sun, San Diego, CA (US); Mahmoud Watfa, Saint Leonard (CA); Pascal Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,986

(22) Filed: Nov. 9, 2018

(65) Prior Publication Data

US 2019/0082306 A1 Mar. 14, 2019

Related U.S. Application Data

(63) Continuation of application No. 14/917,798, filed as application No. PCT/US2014/054360 on Sep. 5, 2014, now Pat. No. 10,136,266.

(Continued)

(51) Int. Cl.
*H04W 4/06* (2009.01)
*H04W 4/10* (2009.01)
(Continued)

(52) U.S. Cl.
CPC .......... *H04W 4/10* (2013.01); *H04L 65/1073* (2013.01); *H04L 65/4061* (2013.01);
(Continued)

(58) Field of Classification Search
CPC .......... H04W 4/06; H04W 4/02; H04W 4/08; H04W 8/186; H04W 72/005;
(Continued)

(56) References Cited

U.S. PATENT DOCUMENTS

2013/0136036 A1* 5/2013 Chen ..................... H04W 28/24
370/260
2013/0308527 A1* 11/2013 Chin .................... H04W 64/003
370/328

(Continued)

FOREIGN PATENT DOCUMENTS

EP         1638249 A1    3/2006

OTHER PUBLICATIONS

Qualcomm (Architecture & functional requirements for GCSE_LTE,S2-131104, Apr. 2013) (Year: 2013).*

(Continued)

*Primary Examiner* — April G Gonzales
(74) *Attorney, Agent, or Firm* — Quasim A. Shah

(57) ABSTRACT

A communication method implemented on a 3rd Generation Partnership Project (3GPP) communication network includes providing an attachment between a group member of a communication group and a group application server, detecting a detachment between the group member and the group application server, and reestablishing the attachment by the 3GPP communication network. A Mobility Management Entity (MME) may provide the attachment. A Group Communication Service Enabler Application Server (GCSE AS) or a Multipoint Service (MuSe) functionality may detect the detachment. The attachment may be reestablished according to the MuSe functionality. A group communication bearer may have a first priority level for allocating resources to the group communication bearer, and a second priority level for allocating resources to the non-group (Continued)

communication bearer. The second priority level may be different from the first priority level. Different Quality Control Indexes (QCIs) may be provided to the group communication bearer and the non-group communication bearer.

20 Claims, 13 Drawing Sheets

Related U.S. Application Data

(60) Provisional application No. 61/877,029, filed on Sep. 12, 2013.

(51) Int. Cl.

| | |
|---|---|
| *H04W 76/19* | (2018.01) |
| *H04L 29/06* | (2006.01) |
| *H04W 4/08* | (2009.01) |
| *H04W 8/18* | (2009.01) |
| *H04W 4/80* | (2018.01) |
| *H04W 88/02* | (2009.01) |
| *H04W 84/18* | (2009.01) |
| *H04W 4/021* | (2018.01) |
| *H04L 29/08* | (2006.01) |
| *H04W 64/00* | (2009.01) |
| *H04W 8/06* | (2009.01) |

(52) U.S. Cl.
CPC .............. *H04L 67/14* (2013.01); *H04W 4/021* (2013.01); *H04W 4/06* (2013.01); *H04W 4/08* (2013.01); *H04W 4/80* (2018.02); *H04W 8/186* (2013.01); *H04W 64/00* (2013.01); *H04W 76/19* (2018.02); *H04W 84/18* (2013.01); *H04W 88/02* (2013.01); *H04W 8/06* (2013.01)

(58) Field of Classification Search
CPC . H04W 76/002; H04W 28/0268; H04W 4/10; H04W 76/19; H04W 4/021; H04W 64/00; H04W 8/06; H04L 65/4076; H04L 12/18; H04L 65/4061
See application file for complete search history.

(56) References Cited

U.S. PATENT DOCUMENTS

| | | | | |
|---|---|---|---|---|
| 2015/0382159 | A1* | 12/2015 | Kim | H04W 4/80 370/312 |
| 2016/0150373 | A1* | 5/2016 | Kim | H04W 8/005 455/456.3 |
| 2016/0309401 | A1* | 10/2016 | Baek | H04W 8/005 |

OTHER PUBLICATIONS

3GPP-2 (TS 22.468-c00 vol. SA WG1, No. 12.0.0, 201306, Jun. 2013) (Year: 2013).*

3GPP-4 (23703-041-ProSe-cl - Layer-2 group ID, Jun. 2013) (Year: 2013).*

3rd Generation Partnership Project; Technical Specification Group Services and System Aspects; Group Communications System Enablers for LTE (GCSE_LTE) (Release 12), 3GPP TS 22468 V12.0.0 (Jun. 2013), Jun. 2013, 22 pages.

3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.1.0, Jun. 2013, 291 pages.

3rd Generation Partnership Project; Technical Specification Group Core Network and Terminals; Technical realization of Cell Broadcast Service (CBS) (Release 12), 3GPP TS 23.041 V12.2.0, Jun 2013, 65 pages.

United States Office Action, U.S. Appl. No. 14/917,798, dated Apr. 18, 2017, 16 pages.

3rd Generation Partnership Project; Technical Specification Group Services and System Aspects; Study on architecture enhancements to support Proximity Services (ProSe) (Release 12), 3GPP TR 23.703 V0.5.0, Jul. 2013, 176 pages.

3rd Generation Partnership Project; Technical Specification Group Services and System Aspects; Multimedia Broadcast/Multicast Service (MBMS) user services; Stage 1 (Release 11), 3GPP TS 22.246 V11.0.0, Sep. 2012, 17 pges.

Deutsche Telekom NEC,GCSE Architecture based on IMS, 3GPP Tdoc S2-131851, SA WG2 Meeting #S2-97, Busan South Korea, May 27-31, 2013, 10 pages.

3rd Generation Partnership Project; Technical Specification Group Services and System Aspects; Study on architecture enhancements to support Group Communication System Enablers for LTE (GCSE_LTE) (Release 12), 3GPP TR 23.768 V0.3.0, Jul. 2013, 34 pages.

United States Office Action, U.S. Appl. No. 14/917,798, dated Sep. 21, 2016, 18 pages.

International Search Report and Written Opinion, International Application No. PCT/US2014/054360, dated Dec. 4, 2014, 13 pages.

3rd Generation Partnership Project; Technical Specification Group Radio Access Network; Evolved Universal Terrestrial Radio Access Network (E-UTRAN); General aspects and principles for interfaces supporting Multimedia Broadcast Multicast Service (MBMS) wit, 3GPP TS 36.440 V11.2.0, Mar. 2013, 12 pages.

3rd Generation Partnership Project; Technical Specification Group Services and System Aspects; Study on architecture enhancements to support Proximity Services (ProSe) (Release 12), 3GPP TR 23.703 V0.4.1, Jun. 2013, 85 pages.

* cited by examiner

GROUP COMMUNICATION SERVICE ENABLER (GCSE) GROUP MANAGEMENT

CROSS REFERENCE TO RELATED APPLICATIONS

This application is a Continuation of U.S. patent application Ser. No. 14/917,798 filed Mar. 9, 2016 which is the National Stage Application filed under 35 U.S.C. 371 of International Patent Application No. PCT/US14/54360, filed Sep. 5, 2014, and claims the benefit of U.S. Provisional Application No. 61/877,029 filed Sep. 12, 2013.

FIELD OF THE INVENTION

This application is related to wireless communications.

BACKGROUND

In 3GPP Release 12, SA and RAN standardization groups worked on a Group Communication Service Enabler for a Long-Term Evolution (GCSE_LTE) study item. See, for example, 3GPP TR23.768. GCSE_LTE may be a $3^{rd}$ Generation Partnership Project (3GPP) feature for enabling application layer functionality to provide group communication over an Evolved Universal Terrestrial Radio Network (E-UTRAN). Furthermore, a group communication service may provide a mechanism for distributing the same content to multiple users in a controlled manner. As an example, the concept of group communications may be used extensively in the operation of classical Land Mobile Radio (LMR) systems used by public safety organizations. The primary use of a group communication service in LMR may be providing Push To Talk (PTT) functionality. Thus, a group communication service based on 3GPP architecture, using LTE radio technology, may enable PTT voice communications with comparable performance.

The group communication service may allow flexible modes of operation when the users and the environment they operate in evolve. For example, LTE may allow broadband communication. Thus, a group communication service may support voice, video, or more generally, data communication. Also, LTE may allow users to communicate with several groups at the same time in parallel, e.g., voice to one group, and different streams of video or data to several other groups. The users of the group communication service may be organized into groups and a user may be a member of more than one group.

3GPP TR 22.486 lists requirements for developing enablers, i.e., modular functions and open interfaces (e.g., a resource efficient distribution mechanism) that may be used to design group communication service. Some of the high level requirements may include the following: the ability to make use of the GCSE provided by the 3GPP, the ability to be enabled on a group member basis, the ability to provide a mechanism to indicate network support of GCSE to the User Equipment (UE), and the ability to indicate the network support of GCSE to the user. Other high level requirements may include the GCSE supporting various media such as conversational type communication (e.g., voice, video), streaming (e.g., video), data (e.g., messaging), or a combination of them. The system described in 3GPP TR 22.486 may have the ability to uniquely identify a GCSE group, and uniquely identify a group member within a GCSE group. It may provide a mechanism for sending a group communication to all receiver group members. The receiver group members of the GCSE group may be able to receive communications from the GCSE group via group communication. The system of 3GPP TR 22.486 may also be able to authorize a group member to become a transmitter group member. A transmitter group member may be able to transmit to a GCSE group that is a member of the GCSE group, with or without being a receiver group member. The interface between the GCSE client on the UE and the network may be an open interface, and the network may provide a third party interface for group communication. This may imply that the interface supports features such as charging and authentication/authorization. The system may also provide a mechanism for a group member that is not connected via a 3GPP network, to communicate in a group communication for a GCSE group that it may be a member of.

Some of the requirements for group management in a GCSE_LTE system may be the following. The system may provide a mechanism for the dynamic creation, modification and deletion of GCSE groups. Information associated with a GCSE group may be used by the system to identify the GCSE group, and to specify attributes that determine how the group can be changed and used. The information may be used, e.g., to indicate which group members may be authorized for administrative functions, and to determine whether the GCSE group can be relayed via a Proximity Service (ProSe). The system may also provide notification of the creation or deletion of a GCSE group to its group members. If authorized, a user may be able to request and receive a list of all the GCSE groups for which it may be a group member. A mechanism may be provided such that, if authorized, a user may modify information associated with a GCSE group, add or remove group members of a GCSE group, and/or create/delete a GCSE group. If authorized, a user may also be able to request and receive a list of group members of a particular GCSE group. If authorized, a user may request a notification of when specific group members or any group member(s) may be added to or removed from a particular GCSE group.

Furthermore, the system may provide a mechanism for remotely configuring a UE with GCSE related information. A transmitter group member may transmit a group communication for a GCSE group without knowledge of the identities of other GCSE group members. A group member may request to join or leave an established group communication. The system may provide a mechanism to setup, release, and modify a Multipoint Service (MuSe) with applicable parameters, e.g., Quality of Service (QoS) or priority. The system may also validate parameters received in the request to setup or modify a group communication based on a policy specified by the group's subscription information, e.g., it may check for QoS or priority. The system may provide the means for notifying the requesting entity of any updates in the status of an on-going group communication. A group member may be able to express an interest in receiving group communications when the GCSE group is used for group communication. The system may provide a mechanism for a receiver group member to receive a group communication in order to be able to accept, reject or ignore the group communication. The system may also provide a mechanism for a receiver group member receiving a group communication to be required to accept the group communication.

High Level Architecture for GCSE

Referring now to FIG. 2, there is shown a high level diagram of GCSE group communication architecture 200. An architecture such as GCSE group communication architecture 200 may be discussed in, e.g., 3GPP TR23.768.

Group communication architecture 200 may include an application layer, and a 3GPP Evolved Packet System (EPS) layer. The application layer may include GCSE Application Server (GCSE AS) 214. The 3GPP EPS layer may include MuSe function 210. MuSe function 210 may interface with 3GPP EPS entities (which may be discussed in TS 23.401) to provide MuSe functionality. The 3GPP EPS layer may also include MME 206, PGW 208, CGSE application server 214 as well as eNBs, SGWs and UEs 204.

The reference points GC1, GC2, GC3, GC4 and GC5 in group communication architecture 200 may be described as follows. GC1 may be a reference point between a GCSE application running in UE 204, and a GCSE application running in GCSE AS 214. It may be used to describe an application level signaling requirement to enable multipoint functionality for GCSE_LTE. GC1 may also enable session establishment, floor control usages, etc. GC2 may be a reference point between GCSE AS 214 and Multipoint Service (MuSe) function 210. It may be used to describe an interaction between GCSE AS 214 and MuSe function 210, which may be provided by the 3GPP EPS layer. GC3 may be a reference point between an E-UTRAN (eNB) and MuSe function 210. It may also be used to describe an interaction between the E-UTRAN and MuSe function 210, in order to achieve multipoint functionality that may be provided by the 3GPP EPS layer. GC4 may be a reference point between Mobility Management Entity (MME) 206 and MuSe function 210. It may be used to describe an interaction between MME 206 and MuSe function 210, in order to achieve multipoint functionality that may be provided by the 3GPP EPS layer. GC5 may be a reference point between Packet Gateway (PGW) 208 and MuSe function 210. It may be used to provide DL unicast service by MuSe function 210.

3GPP LTE Release 8 and/or 9 (LTE Rel-8/9) may support up to 100 Mbps in a downlink (DL), and 50 Mbps in an uplink (UL) for a 2×2 configuration. The LTE DL transmission scheme may be based on an Orthogonal Frequency Division Multiple Access (OFDMA) air interface.

LTE Rel-8/9 and/or Release 10 (collectively "LTE Rel-8/9/10") systems support scalable transmission bandwidths (e.g., for purposes of flexible deployment, etc.). Such scalable transmission bandwidths may include, for example, bandwidths of 1.4, 2.5, 5, 10, 15 and 20 megahertz (MHz).

In LTE Rel-8/9 (and as applicable to LTE Rel-10), each radio frame may have a duration of 10 milliseconds (ms.), and consist of 10 subframes, each of which may be 1 ms. Each subframe may consist of two (2) timeslots of 0.5 ms. each. There may be seven (7) or six (6) Orthogonal Frequency Division Multiplexing (OFDM) symbols per timeslot. The seven (7) symbols per timeslot may be used with a normal cyclic prefix length, and the six (6) symbols per timeslot may be used with an extended cyclic prefix length. Subcarrier spacing for the LTE Rel-8/9 system may be 15 kHz. A reduced subcarrier spacing mode using 7.5 kHz may also be possible.

A Resource Element (RE) may correspond to one (1) subcarrier during one (1) OFDM symbol interval. Twelve (12) consecutive subcarriers during a 0.5 ms. timeslot may constitute one (1) Resource Block (RB). Therefore, with seven (7) symbols per timeslot, each RB may consist of 84 REs. A DL carrier can range from six (6) RBs up to one-hundred ten (110) RBs corresponding to an overall scalable transmission bandwidth of roughly 1 MHz to 20 MHz. Each transmission bandwidth, e.g., 1.4, 3, 5, 10 or 20 MHz, may correspond to a number of RBs.

A basic time-domain unit for dynamic scheduling may be one subframe, which may consist of two consecutive timeslots. This is sometimes referred to as an RB pair. Certain subcarriers of some OFDM symbols may be allocated to carry pilot signals in the time-frequency grid. A number of subcarriers at edges of the transmission bandwidth may not be transmitted in order to comply with spectral mask requirements.

In LTE Rel-8/9, and Rel-10, there may be a single Hybrid Automatic Repeat ReQuest (HARQ) process active in the UL, and a single HARQ process active in the DL. This may occur in a single carrier configuration where the network may assign the UE only one pair of UL and DL carriers (Frequency Division Duplexing (FDD)), or one time shared carrier for UL and DL (TDD), for a subframe LTE Carrier Aggregation (CA)

LTE-Advanced with CA (LTE CA Rel-10) is an evolution for improving single carrier LTE data rates using, among other solutions, bandwidth extensions. With CA, a UE may transmit and receive simultaneously over a Physical Uplink Shared Channel (PUSCH) and a Physical Downlink Shared Channel (PDSCH) (respectively) of multiple serving cells. For example, up to four Secondary serving Cells (SCells) may be used in addition to a Primary serving Cell (PCell), thus supporting flexible bandwidth assignments up to 100 MHz. Uplink Control Information (UCI), which may include HARQ acknowledgment and/or non-acknowledgement (ACK/NACK) feedback, and/or Channel State Information (CSI), may be transmitted either on Physical UL Control Channel (PUCCH) resources of the PCell, or on PUSCH resources available for a serving cell configured for UL transmissions.

Control information for scheduling of PDSCH and PUSCH may be sent on one or more Physical Downlink Control Channel(s) (PDCCH). In addition to LTE Rel-8/9 scheduling using one PDCCH for a pair of UL and DL carriers, cross-carrier scheduling may also be supported by a PDCCH. This may allow the network to provide PDSCH assignments, and/or PUSCH grants for transmissions in one or more other serving cells.

For FDD LTE Rel-10 UE operating with CA, there may be one HARQ entity for each serving cell. Each HARQ entity may have up to 8 HARQ processes, e.g., one per subframe for one Round Trip Time (RTT). Further, for an FDD LTE Rel-10 UE operating with CA, there may be more than one HARQ process active for the UL and for the DL in a subframe, but there may be only one UL and one DL HARQ process per configured serving cell.

SUMMARY OF THE INVENTION

A communication method implemented on a 3rd Generation Partnership Project (3GPP) communication network includes providing an attachment between a group member of a communication group and a group application server, detecting a detachment between the group member and the group application server, and reestablishing the attachment between the group member and the group application server by the 3GPP communication network. A Mobility Management Entity (MME) may provide the attachment between the group member and the group application server. A Group Communication Service Enabler Application Server (GCSE AS) may detect the detachment between the group member and the group application server. The MME may detect the detachment between the group member and the group application server. A Multipoint Service (MuSe) functionality may detect the detachment between the group member and the group application server. The attachment between the group member and the group application server may be reestablished according to the MuSe functionality. The group member may receive a notification and reestablish the attachment between the group member and the group application server in response to the notification.

The 3GPP communication network may determine a location of the group member, and reestablish the attachment between the group member and the group application server according to the determined location. The 3GPP communication network may transmit the determined location to the group application server, and the group application server may reestablish the attachment between the group member and the group application server according to the transmitted location. A plurality of group members may be located within a group service area and at least two group members of the plurality of group members may attach to different group application servers.

An Interworking Function (IWF) entity may be provided between the 3GPP network and the group application server. The IWF entity may locate the group application server, and forward a communication from the 3GPP communication network to the group application server according to the locating. A cell may have a 3GPP identifier and the attachment between the group member and the group application server may be reestablished according to the 3GPP identifier.

A group communication bearer may have a first priority level for allocating resources to the group communication bearer. A non-group communication bearer may have a second priority level for allocating resources to the non-group communication bearer. The second priority level may be different from the first priority level. The first priority level may be higher than the second priority level. Different Quality Control Indexes (QCIs) may be provided to the group communication bearer and the non-group communication bearer according to the first and second priority levels. Different QCIs may be provided to the group communication bearer and the non-group communication bearer in downlink traffic. Different QCIs may be provided to the group communication bearer and the non-group communication bearer in unicast traffic. Different pre-emption vulnerabilities may be provided to the group communication bearer and the non-group communication bearer according to the first and second priority levels. Different pre-emption capabilities may be provided to the group communication bearer and the non-group communication bearer according to the first and second priority levels.

A communication method includes providing an attachment between a group member of a communication group and a group communication system, detecting a detachment between the group member and the group communication system, and reestablishing the attachment between the group member and the group communication system according to a 3GPP system. The method may also provide an indication of group availability to the group member by the group communication system, the 3GPP system determining the location of the group member, and reestablishing the attachment according to the determined location. Transmitting the determined location by the 3GPP system to the group communication system, and the group communication system reestablishing the attachment according to the transmitted location, may also be provided. A broadcast region may be optimized according to the determined location, and an EPS node may be activated according to the determined location. A determination may be made whether the group member is in a subscribed group service area according to the determined location. The group member may be located within a group service area. A plurality of group members may be located within the group service area, and at least two group members of the plurality of group members may attached to different group communication systems.

A GCSE service area may be associated with an identifier which may be a Globally Unique Identifier (GUID). Such an identifier may be broadcast by the cells in the GCSE service area. The GCSE service area identifier may also be exchanged between UEs, or between a UE and a network entity in dedicated Radio Resource Control (RRC) messages, in Non-Access Stratum (NAS) messages, in GCSE AS specific messages, or using any other higher layer methods such as, but not limited to, Access Network Discovery and Selection Function (ANDSF), Open Mobile Alliance (OMA) Demodulation (DM), SMS, etc.

If an application layer in the UE does not have the capability to perform the mapping of the layer-2 group ID or the application layer group ID, or does not have the mapping information, it may contact a group application server MME or a ProSe. Additionally, it may send a layer-2 group ID. The group application server, an MME or a ProSe server may respond with the translation of the group ID.

A logical node referred to as an Interworking Function (IWF) entity between the 3GPP network and the group communication servers may be provided. The group application server may not be able to reach a group member. In this case, the group application server may involve the 3GPP network in forwarding an invitation or notification to the user. The user may then start to register/join the group.

UE location reporting may be used by the network to optimize a Multimedia Broadcast/Multicast Service (MBMS) broadcast region, to activate/deactivate the downstream EPS controlling nodes, and/or to determine whether the user is in the subscribed GCSE service area. A NAS procedure may be provided for the purpose of handling group management. A NAS message may be referred to as a ProSe request, which may be initiated from an idle mode or a connected mode, i.e., the message may be sent as a first UE NAS message.

If a request to create a group is sent, the MME may update the UE's context to include the newly formed group. Moreover, the MME may maintain an indication that the UE is the group owner (if this is allowed or the case). A Quality Control Index (QCI), a priority level, a pre-emption capability and a pre-emption vulnerability of a user within a GCSE group may be assigned on a per UL unicast traffic bearer basis.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the figures and the detailed description are not to be considered limiting, and other equally effective examples are possible and likely. Furthermore, like reference numerals in the figures indicate like elements.

DETAILED DESCRIPTION OF THE INVENTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples disclosed herein.

Example Architecture

When referred to herein, the terms "user equipment" and its abbreviation "UE" may mean (i) a WTRU, such as described infra, (ii) any of a number of embodiments of a WTRU, such as described infra, (iii) a wireless-capable and/or wired-capable (e.g., capable of being tethered) device configured with, inter alia, some or all structures and functionality of a WTRU, such as described infra, (iii) a wireless-capable and/or wired-capable device configured with less than all structures and functionality of a WTRU, such as described infra, or (iv) the like. Details of an example WTRU, which may be representative of any UE recited herein, are provided below with respect to FIGS. 1A-1C.

When referred to herein, the terms "evolved Node-B" and its abbreviations "eNB" and "eNode-B" may mean (i) a base station, such as described infra, (ii) any of a number of embodiments of a base station, such as described infra, (iii) a device configured with, inter alia, some or all structures and functionality of a base station or eNB, such as described infra, (iii) a device configured with less than all structures and functionality of a base station or eNB, such as described infra, or (iv) the like. Details of an example eNB, which may be representative of any eNB recited herein, are provided below with respect to FIGS. 1A-1C.

When referred to herein, the terms "mobility management entity" and its abbreviation "MME" may mean (i) an MME, such as described infra, (ii) an MME according to a 3GPP LTE release, (iii) an MME according to a 3GPP LTE release modified, extended and/or enhanced according to the description that follows, (iii) a device configured with, inter alia, some or all structures and functionality of any of the aforementioned MMEs, (iv) a device configured with less than all structures and functionality of any of the MMEs of (i) and (ii) above, or (iv) the like. Details of an example MME, which may be representative of any MME recited herein, are provided below with respect to FIGS. 1A-1C.

Figure 1A:
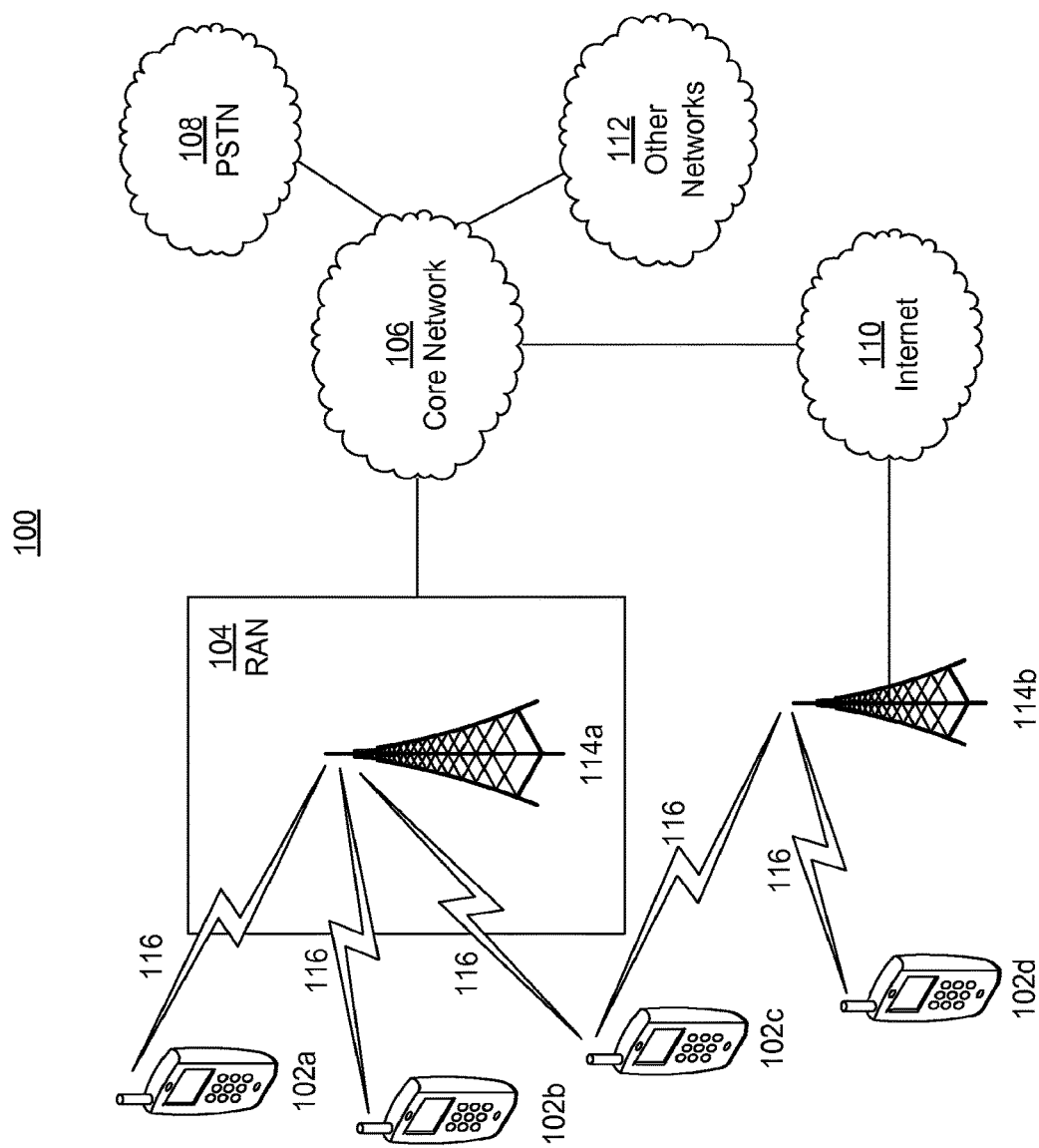
FIG. 1A is a diagram of an example communications system in which one or more disclosed embodiments may be implemented.

FIG. 1A is a diagram of an example communications system 1100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), Frequency Division Multiple Access (FDMA), OFDMA, single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a Public Switched Telephone Network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include UEs, a mobile station, a fixed or mobile subscriber unit, a pager, a cellular telephone, a Personal Digital Assistant (PDA), a smartphone, a laptop, a netbook, a personal computer, a tablet computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a Base Transceiver Station (BTS), a Node-B, an eNode B, a Home Node B, a Home eNode B, a site controller, an Access Point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a Base Station Controller (BSC), a Radio Network Controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ Multiple-Input Multiple Output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., Radio Frequency (RF), microwave, Infrared (IR), Ultraviolet (UV), visible light, etc.). The air interface 116 may be established using any suitable Radio Access Technology (RAT).

More specifically, as noted herein, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using LTE and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a Wireless Local Area Network (WLAN). In another embodiment, the base station 114b and the WTRUs 102c, 102d may implement a radio technology such as IEEE 802.15 to establish a Wireless Personal Area Network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP) and the Internet Protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
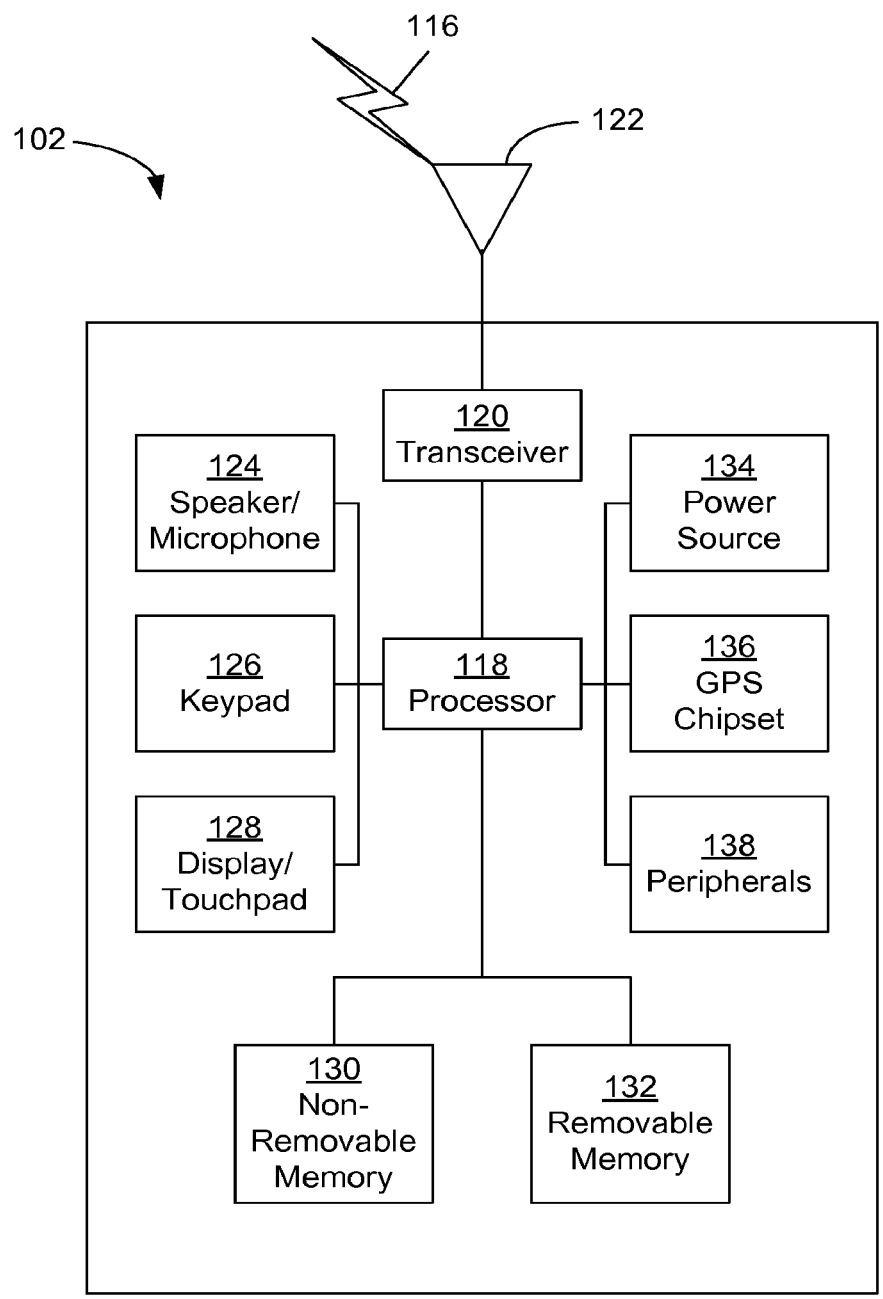
FIG. 1B is a system diagram of an example Wireless Transmit/Receive Unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 19, removable memory 132, a power source 134, a Global Positioning System (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a Digital Signal Processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a Liquid Crystal Display (LCD) display unit or Organic Light Emitting Diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 19 may include random-access memory (RAM), Read Only Memory (ROM), a hard disk, or any other type of memory storage device. The removable memory 132 may include a Subscriber Identity Module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., Nickel-Cadmium (NiCd), Nickel-Zinc (NiZn), Nickel Metal Hydride (NiMH), Lithium-Ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a Universal Serial Bus (USB) port, a vibration device, a television transceiver, a hands free headset, a Bluetooth® module, a Frequency Modulated (FM) radio unit, a digital music player, a media player, a video game player module, an Internet browser, and the like.

Figure 1C:
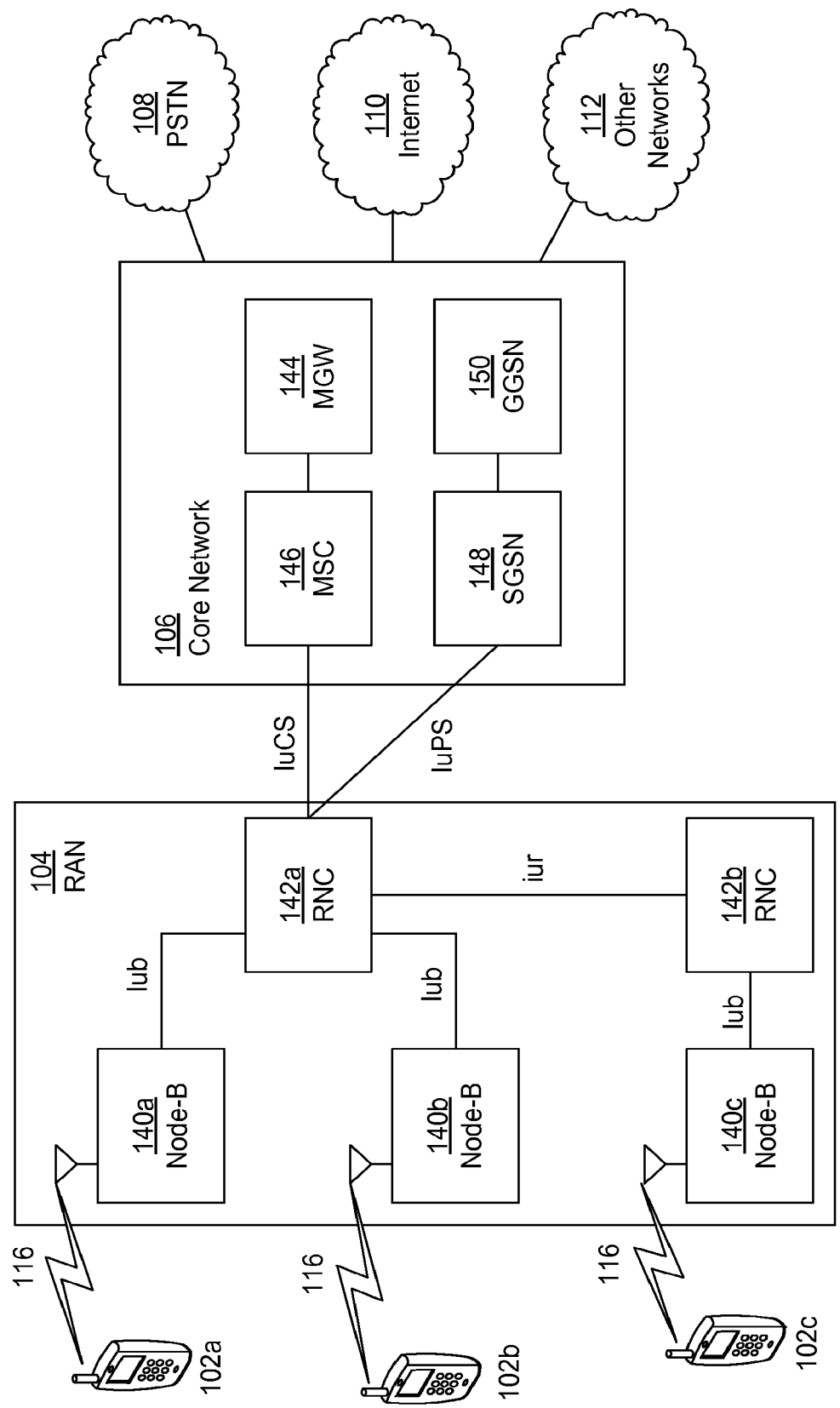
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a Media Gateway (MGW) 144, a Mobile Switching Center (MSC) 146, a Serving General Packet Radio Service (GPRS) Support Node (SGSN) 148, and/or a Gateway GPRS Support Node (GGSN) 150. While each of the foregoing elements is depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
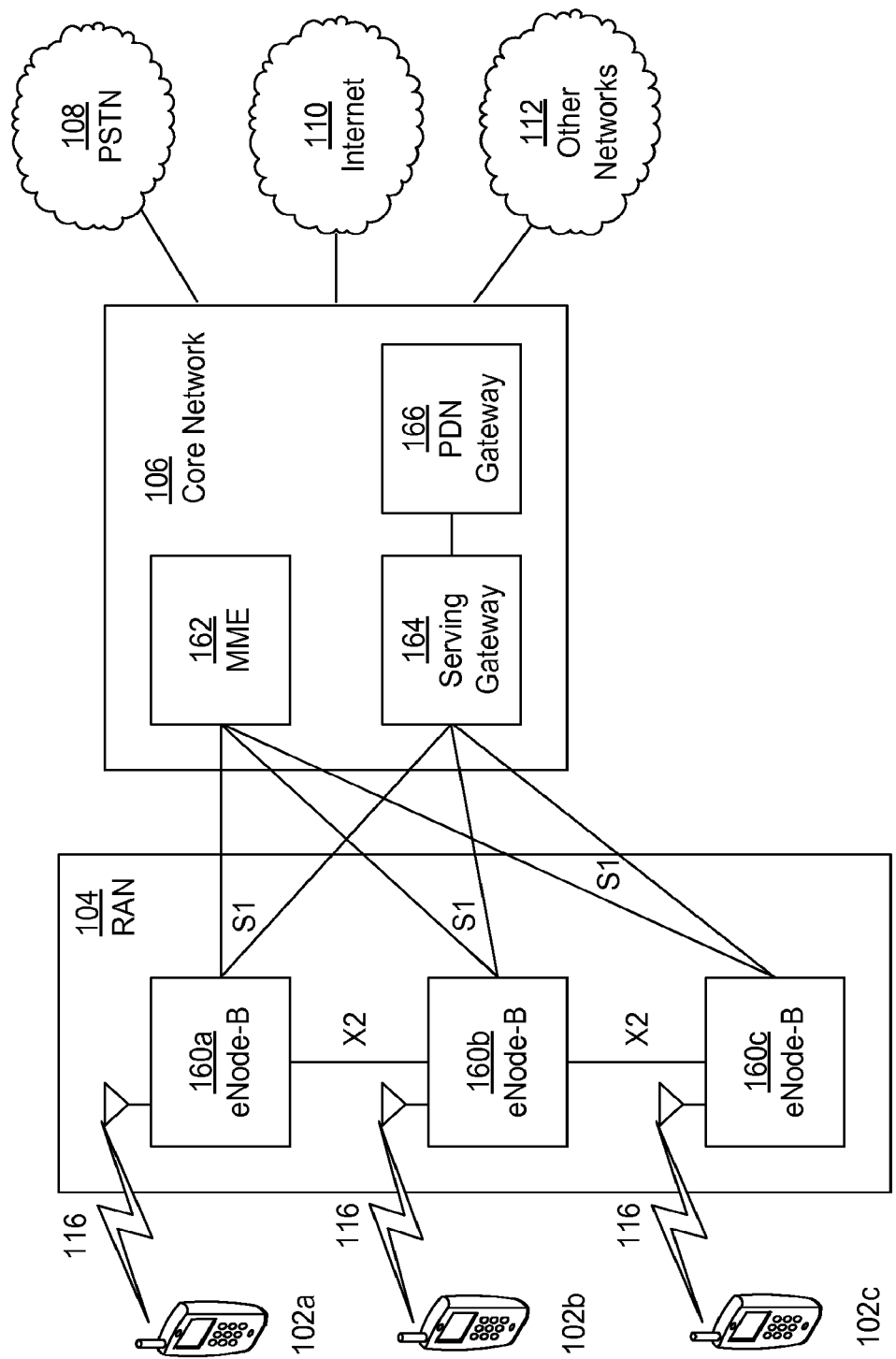
FIG. 1D is a system diagram of another example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1D, the eNode-Bs 160a, 160b, 160c may communicate with one another over an X2 interface.

The core network 106 shown in FIG. 1D may include a MME 162, a serving gateway 164, and a Packet Data Network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP Multimedia Subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
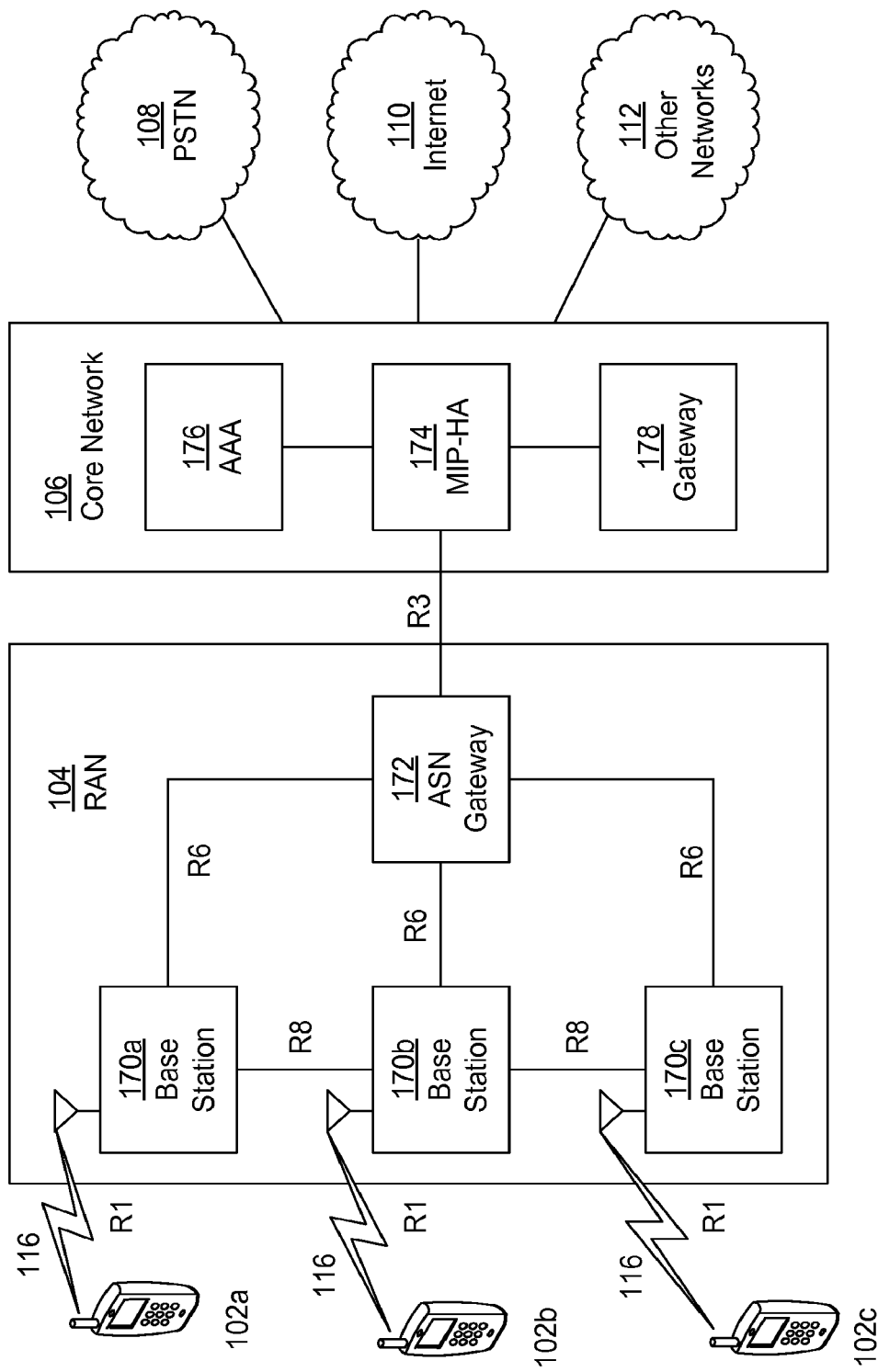
FIG. 1E is a system diagram of another example radio access network and an example core network that may be used within the communications system illustrated in FIG. 1A.
Figure 2:
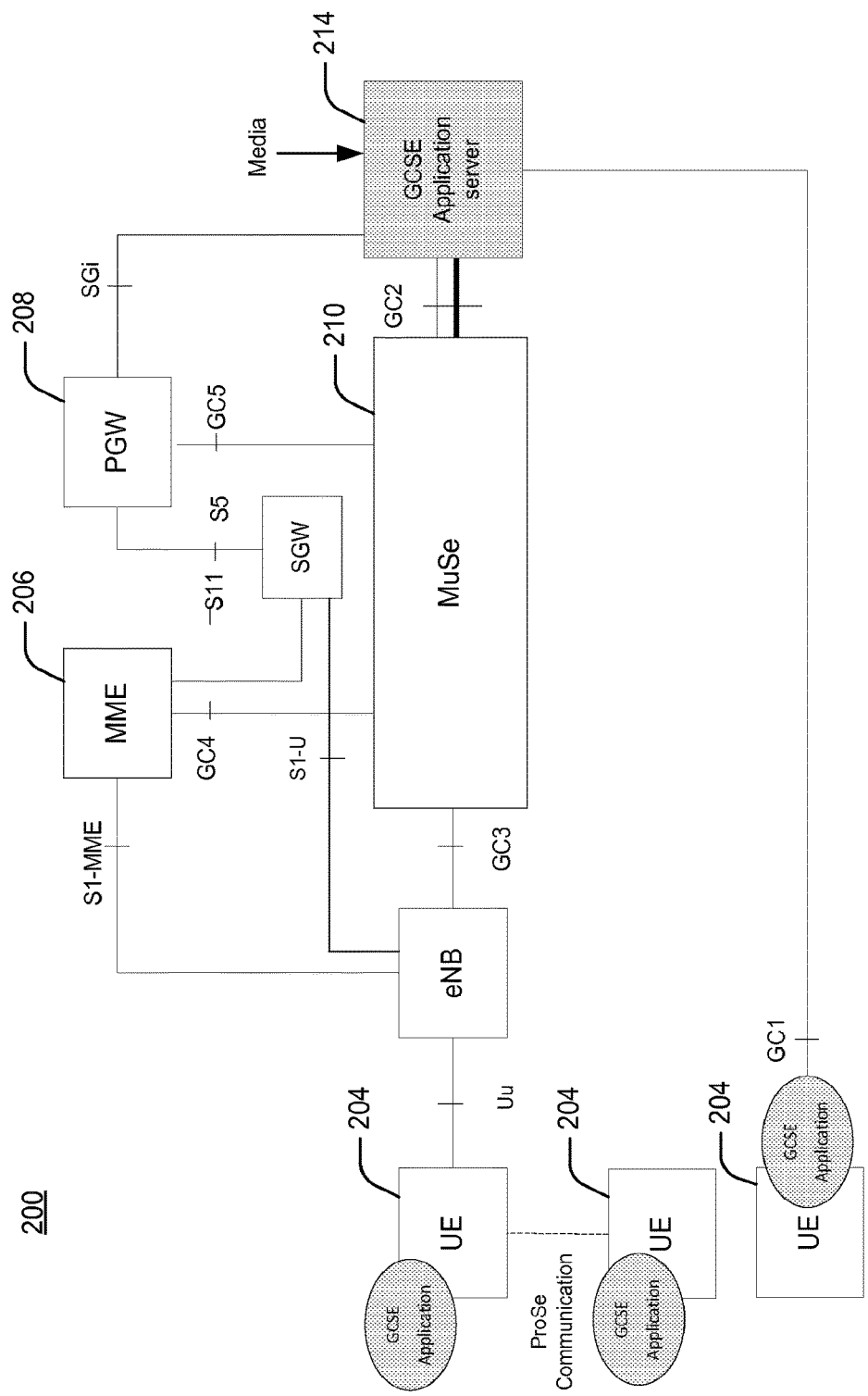
FIG. 2 is a system diagram of an example GCSE_LTE architecture.

FIG. 1E is a system diagram of the RAN 104 and the core network 106 according to an embodiment. The RAN 104 may be an Access Service Network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 170a, 170b, 170c, and an ASN gateway 142, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, QoS policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, 170c may be defined as an R8 reference point that includes protocols for facilitating WTRU handovers and the transfer of data between base stations. The communication link between the base stations 170a, 170b, 170c and the ASN gateway 142 may be defined as an R6 reference point. The R6 reference point may include protocols for facilitating mobility management based on mobility events associated with each of the WTRUs 102a, 102b, 102c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a Mobile IP Home Agent (MIP-HA) 144, an Authentication, Authorization, Accounting (AAA) server 146, and a gateway 148. While each of the foregoing elements are depicted as part of the core network 106, it will be appreciated that any one of these elements may be owned and/or operated by an entity other than the core network operator.

The MIP-HA 144 may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 11, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Referring again to GCSE group communication architecture 200, group management may be handled between UE 204, GCSE AS 214 and an Evolved Packet Core (EPC). MuSe function 210 may be considered a black box. Therefore, the group management procedures may be independent of architecture options. These procedures may be controlled by the network and applied to UEs 204 joining a GCSE group. Additionally, they may be independent of the choice of architecture for the GCSE.

Defining a GCSE Service Area

Based on the requirements discussed herein, the group members may receive and/or transmit only within the cells corresponding to an area indicated by the geographical scope of a GCSE group. When requested, a notification may be sent to a requesting entity if a group member ceases to participate in the communications from the GCSE group, e.g. in a case of a group with restricted geographic scope, when the group member leaves the service area of the group.

Solutions may be proposed for describing a GCSE service area (e.g., the relationship between a GCSE service area and a Multicast Broadcast Single Frequency Network (MBSFN) area etc.), how the GCSE may be accomplished for groups with a geographic scope, and how notifications may be provided when a group member ceases to communicate with its GCSE group, due to, for example, leaving the service area of the group. Moreover, it may be possible for the group service area to be dynamic, i.e., it may expand or shrink based on the number of UEs in the group and their location.

GCSE Group Configuration

Some of the group configurations or group management requirements may have been studied in 3GPP TR23.768. The group management operations which may be investigated may include the establishment of a GCSE group. Furthermore, when a new group is established, several scenarios may be considered. These scenarios may include one or more of the following. The new group may be statically configured or dynamically created. The creation of a new group may be initiated by a server or by a user, and newly created group information may be provided to potential members. Furthermore, users requesting to join a GCSE group may be authorized.

Moreover, the selection and role of a group leader may be described and investigated. The functionalities of the GCSE group leader may not be clear. How a specific group leader may be elected or selected may be ambiguous in the study. Therefore, clear solutions may not be provided for such problems. The issues described for the group creation may also apply to reorganization or release of the group.

Requirements for 3GPP Network Assistance in Group Management

In general, most group management procedures may occur between the UE's group application and a group application server running in an application layer, e.g., via extended Session Initiation Protocol (SIP) signaling, and may be transparent to the 3GPP network.

Figure 3:
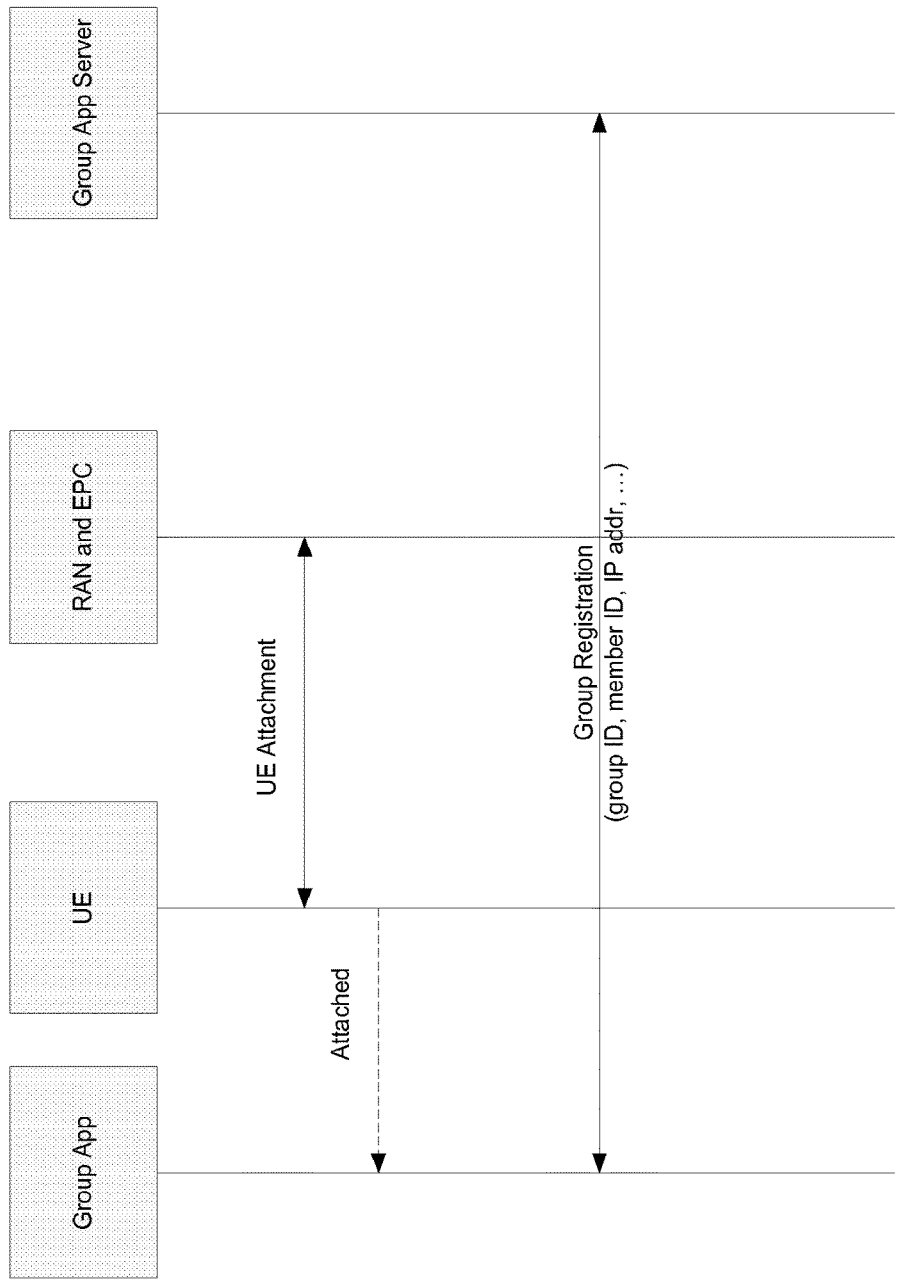
FIG. 3 is a diagram of an example group member registration procedure.

Referring now to FIG. 3, there is shown a representation of group registration procedure 300. Upon successful attachment to a 3GPP network, the group application in the UE may register with the group application server via application layer signaling. It may also provide information such as its group ID, its group member ID, its assigned IP address, its authorization information, etc. However, there may be cases where the 3GPP network may be required to assist in group management procedures. While the operations and architectures described herein may be described with respect to UEs, it will be understood that the descriptions may refer to any type of WTRU device.

UE Status Update

Group members may have a reachability status for indicating whether a group member can be reached, for example, by the GCSE. In particular, the reachability of a group member by the GCSE application server may be indicated. Furthermore, a group member's reachability status may be changed, and the group application server may not be updated with such a change. For example, this may occur when the UE becomes detached for any of a variety of reasons. Since application layer communication may not be possible, the UE's group application may not update the server with this occurrence. Additionally, the UE may have selected another RAT/network that does not support group communication. Furthermore, data service may not be available in the new RAT/network. The UE may move to an area that does not support group communication, or may not support some features of group communication (e.g., multicast). Furthermore, the UE application may be not aware of some or all changes. The UE application may not be able to communicate with the application server due to some 3GPP network controls. The controls may include, without limitation, access barring, congestion control, application specific access control, long DRX/power saving state, etc.

When a detachment situation occurs and is detected, the reachability status or group communication capabilities of the group member may not be accurate in the group application server. Thus, the server may unnecessarily continue to send application signaling/data to the user. In these situations, it may be helpful if the 3GPP network can timely communicate the UE's status change to the group application server. This may help reattach the group member to the group application server.

Invitation to Register/Join a Group

When a new group is dynamically created, the group administrator may send an invitation to a potential group member asking it to register/join the new group. The invitation may also be sent via application layer signaling. Under these circumstances, some of the members of the new group may already be members of another group (e.g., they may be statically pre-configured groups). Alternately, some of the potential members of the new group may not be members of any other group.

In the first case, the new dynamic group administrator may have access to the group member's reachability information (e.g., its IP address). This may occur if the new group server and the existing group server are the same, or under the control of the same organization. There may also be a chance that the new group does not have access to such information. In the latter case, the new group may not have the means to reach the user either. In these cases, the 3GPP network may be involved by sending the invitation to the potential group members.

Group Member's 3GPP Network Information Collection/Feedback

A list of MBMS control plane nodes (MMEs, SGSNs for MBMS GW) determined by BM-SC, may be signaled in the session start procedure of a MBMS session. This may be described in "TS 22.246 MBMS; architecture and functional description." How a BM-SC acquires the information may be specified. The simplest configuration may be one in which group communication may be broadcast in an entire group/GCSE service area. However, this may not be an optimal use of resources if the group is small and operates in a small geographical region. Permanent RRC connected devices may be possible, and an existing user location reporting mechanism may be utilized for the network to determine group user locations. However, the group user may need to be a RRC connected device. This may have a battery life penalty if the group communication is not very frequent.

ProSe UE to Network Relay for Group Communication

Systems have been proposed in which a UE to network relay for GCSE may be based on an application level proxy in a relay UE. This may require the relay UE to understand the application protocol of the group, and to be able to read the application level information of the relayed GCSE users. This model may be suitable for a UE which belongs to the same group as the relayed GCSE users. If there is no ProSe UE-to-network relay which belongs to the same group, the mechanisms discussed herein may not be feasible. A mechanism for enabling relaying independently of group affiliation may be needed.

Priority of Groups

In some group communications, different transport paths, e.g., unicast/multicast delivery, may be possible. Additionally, in some group communications, the priority and pre-emption capability for a particular media within a Public Land Mobile Network (PLMN) may be the same, no matter which transport path may be selected.

Furthermore, a group communication may include different media, e.g., voice and picture. In some GCSE group communications, different users may have different priorities. When resources are limited, a system may release resources allocated for group communications based on priority levels. It may also release resources based on the pre-emption capabilities of the different communication groups.

Rules regarding the assignment of priority levels and pre-emption capabilities of the traffic and/or users of the group communication, including priority assignment of group communication versus non-group communication, may be provided. A bearer (e.g., not supporting MBMS) may be provided in UMTS/LTE on a bi-directional basis. For group communication, a bearer model in support of priority and pre-emption handling, e.g., user priority within the same communication group instance, may be provided.

Security Procedures

A security requirement for group communication may be that the system may support at least the same security level as group communication in a 3GPP LTE packet data bearer. For example, the system may support authentication, integrity, confidentiality and privacy requirements. Furthermore, for example, if a MBMS security procedure (e.g. described in 3GPP TS 33.246) is re-used, modification/change may be required. As another example, if a group member leaves a group (i.e., it leaves the group while a group communication session is underway), it may be necessary to ensure that the user can no longer receive the group communication. Additionally, if a communication is realized through a group cast using PDSCH, additional security procedures may be required.

GCSE Service Area Definition

In a possible embodiment of a GCSE service area, the GCSE service area may be provided as any of the following. It may be a collection of cells, e.g., the cells may have the same Closed Subscriber Group (CSG) ID or belong to a list of CSG IDs. Additionally, the cells may be a local home network. Alternately, the GCSE service area may be, e.g., a local enterprise network, or a combination of tracking area IDs. The GCSE service area may span cells from multiple PLMNs, or it may span multiple CSGs. The GCSE service area may span multiple MBSFN areas. It may also be described by a specific number of GCSE groups. Furthermore, a list of non-3GPP APs, e.g., Wi-Fi AP with the same SSID, may form a GCSE service area. Alternately, the APs of a list of non-3GPP APs may be in combination with any of the points described herein. Furthermore, the areas of active UEs may constitute a GCSE service area A GCSE service area may be associated with an identifier, which may be a GUID. Such an identifier may be broadcast by the cells in the GCSE service area. The GCSE service area identifier may also be exchanged between the UEs. It may be exchanged between the UE and a network entity in dedicated RRC messages, in NAS messages, GCSE AS specific messages, or other higher layer methods. Other methods may include, but are not limited to, ANDSF, OMA DM, SMS, etc. The GCSE service area identifier may be used by a UE or a network entity (MME, eNB/HeNB, GWs including GCSE AS or MuSe), in support of group management or group communication between various GCSE capable UEs. The UEs in a group service area may be part of the same GCSE group, or they may be part of different GCSE groups.

A group service area ID may be used by a group application server or the EPS, in order to track the users in a particular group. The GCSE application in the UE, or in other protocol messages in the UE (e.g., NAS, RRC, etc.), may include the service area ID when contacting the GCSE application server (or any other network nodes, e.g., MME, eNB, etc.). Hence, the application server may know about the location of a particular GCSE group member at a larger granularity.

Furthermore, the group service area ID may also be used by the UE to determine whether a group is in a specific service area. To enable such a feature, there may be a mapping between the group service ID and the group ID. For example, a group with a specific ID may be available in various group service areas with a different group service ID. When the UE is in a particular group service area, it may determine which groups may be available to be joined, using the group ID for the service area. This can be achieved using a mapping between the group ID and the group service area ID at the UE, e.g., at the GCSE application or by configuration through OMA DM or Universal Subscriber Identity Module (USIM)). Alternatively, the UE may send the group service ID to the GCSE application server requesting the group ID associated with the group service ID.

Mapping of Group ID and Group Application ID

The 3GPP network may broadcast the layer-2 group ID of the groups which may be supported in a particular cell or in a particular GCSE service area. The layer-2 ID may be broadcasted by RAN in the System Information Block (SIB) signaling, or it may be sent to the UE by way of dedicated RRC by the eNB. Alternately, it may be sent by NAS signaling by the MME.

When the UE receives the layer-2 group ID it may forward the ID to the group application layer in the UE. It may be possible that the application layer in the UE contains the mapping of the layer-2 group ID and the group application layer ID. If the application layer has the mapping it may know whether the user or the UE is interested in the particular group application. If it is interested in being part of that group application, it may contact the group application server.

Alternatively, if the application layer in the UE does not have the capability to perform the mapping of the layer-2 group ID and the application layer group ID, or does not have the mapping information, it may contact the group application server MME or the ProSe server. It may send a layer-2 group ID to one of them. The group application server, MME or ProSe server may respond with a translation of the group ID, and thus provide the group application ID. The group application in the UE may then use the group application ID to contact the appropriate group application server.

Notification for Entering or Leaving a Service Area

Figure 4:
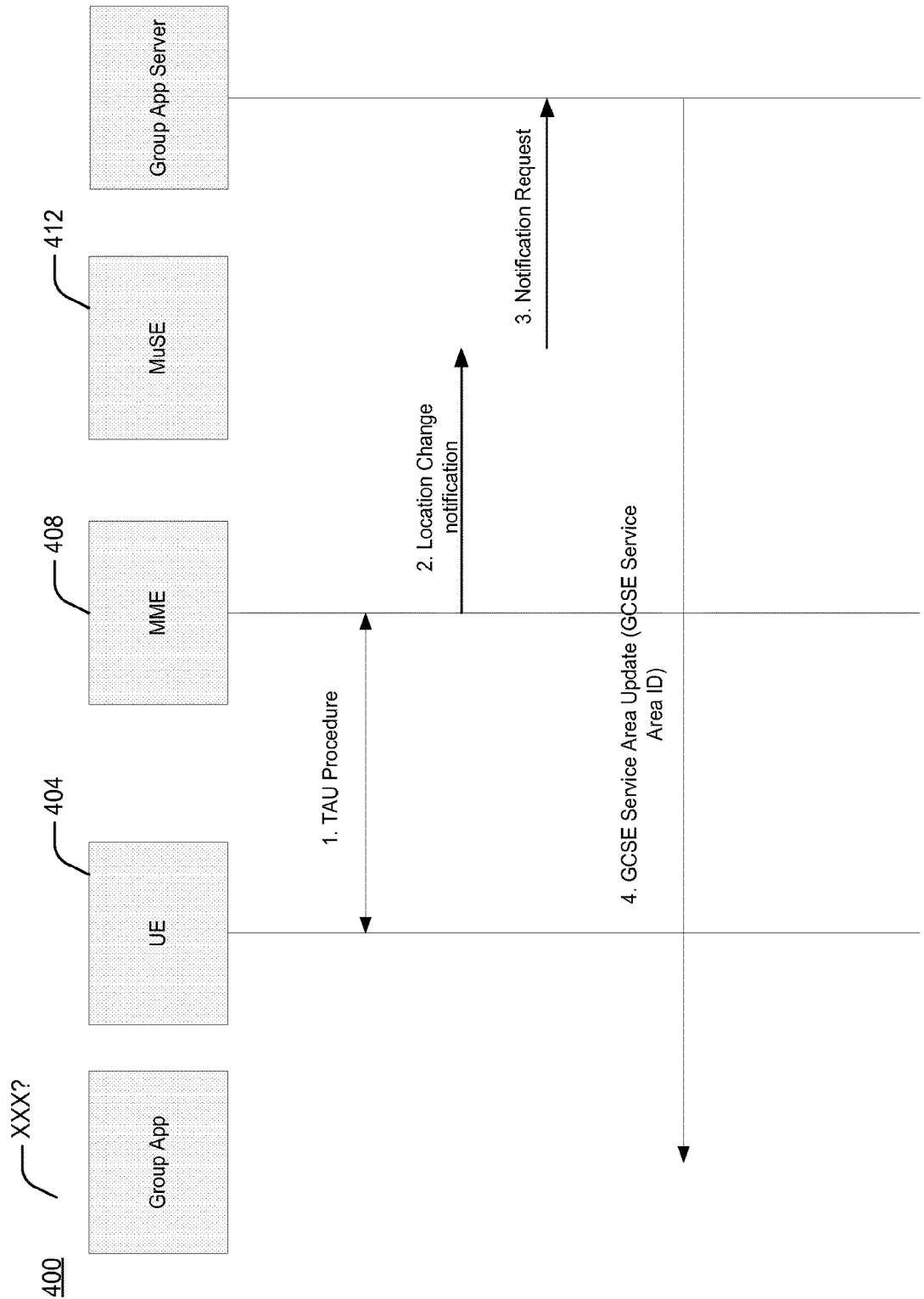
FIG. 4 is a diagram of an example notification procedure for entering a new service area.

Referring now to FIG. 4, there is shown a possible embodiment of notification procedure 400. In notification procedure 400, UE 404, running GCSE group application 402, may be notified by a GCSE system whenever it enters a new GCSE service area. Thus, for example, UE 404 may be notified when it enters a GCSE service area from a non GCSE area. It may also be notified when it enters a GCSE service area with a different GCSE service area ID. This type of notification may help UE 404 determine if it may be served by the cell, tracking area, etc. in which there is support for GCSE. It may also help determine which groups in the area may be available for UE 404 to join. The notification may be sent as user plane signaling between GCSE application server 416 and GCSE group application 402 in UE 404, or via NAS messages, ANDSF, OMA DM, etc.

MuSe function 412 may keep track of the GCSE UEs operating in the 3GPP system since it can interface with MME 408 via the GC4 interface. It may also interface with the eNB via the GC3 interface. It may be assumed that, for any UE 404, MME 408 may be able to determine whether UE 404 is GCSE capable. MME 408 may obtain this information from subscription parameters in a Home Subscriber Service (HSS). Therefore, for every GCSE capable UE 404, MME 408 may report a change in tracking area IDs or cell IDs (or other GCSE service) of the UEs 404 to MuSe function 412.

MuSe function 412 may determine whether the change in the tracking area ID, cell ID, etc. has caused a change in the GCSE service area. It may make this determination since it may have a mapping of the tracking area ID to the GCSE service area ID. If MuSe function 412 determines that there has been a change in GCSE service, it may perform a procedure, such as notification procedure 400, for notifying UE 404. MuSe function 412 may contact the GCSE application server 416 to send the notification message to UE 404. It may also inform UE 404 of the change in the GCSE service area. GCSE application server 416 may also send this message via application level signaling.

The following may be a further description of steps performed in notification procedure 400. UE 404 may enter a new tracking area and perform a TAU procedure. Although not shown in notification procedure 400, in order to simplify the drawing, UE 404 may perform another NAS procedure (e.g., a service request) in a cell. Accordingly, the system may determine a change of the GCSE service area, e.g., based on a different cell ID, regardless of the tracking area identity. This may depend on the configuration of a GCSE service area.

MME 408 may update MuSe function 412 with the new tracking area ID of UE 404 (or the new GCSE service area ID in which UE 404 may be located). MuSe function 412 may determine whether the new tracking area is part of the new GCSE service area. Therefore, it may send a message (i.e., a notification request) to GCSE application server 416, in order to notify UE 404. GCSE group application server 416 may send an application layer signaling message GCSE service area update to inform UE 404 that it has entered a new GCSE service area.

Notification procedure 400 may be performed when 404 UE is in a connected mode, for example, when a handover occurs. Additionally, it may be performed when UE 404 sends a TAU message initiated in an idle mode. In the case of a connected mode handover, step 1 of notification procedure 400 may be different, e.g., the TAU procedure may be replaced with a handover procedure. According to step 1, MME 408 may determine that the serving tracking area or the cell ID, etc. of UE 404 has been updated.

In the case where UE 404 leaves a GCSE service area, a substantially similar procedure may be used to notify UE 404. When UE 404 leaves the GCSE service area, and proceeds to an area where GCSE is no longer available, group application server 416 may send the message of step 4 (GCSE service area update) to UE 404. The message may have an empty GCSE service area ID field, or a dummy GCSE service area ID. When UE 404 receives such a message, it may know that it has left the GCSE service area.

Dynamic Management of the Group Service Area

In some cases it may be possible that a configuration of a group service area may be dynamic. For example, if UE 404 moves out of the service area, but still wants to be part of the group, the service area may be increased. This may be possible if the EPS and GCSE system are able to support the continuation of the ongoing GCSE group communication in the new area that UE 404 has moved to. If the new area is included in the GCSE area, this process may be transparent to UE 404, and UE 404 may continue its GCSE communication.

When the GCSE service area configuration is updated, MuSe function 412 may update the mapping table it has for the mapping between the GCSE service area ID and the tracking area ID. For example, it may apply a new configuration of the GCSE serving area to all UEs 404 in the service area.

Upon an update of the service area, UE 404 may be notified by the system (GCSE system, MuSe function 412, MME 408, or higher layer methods, e.g., ANDSF), so that UE 404 may update its mapping as well. UE 404 may continue its session, without dropping the session, based on previous information concerning the GCSE service area ID.

If a GCSE service area consists of the areas of active UEs, it may be possible that the service area may follow the group owner. Thus, the service area may move according to the movement of the owner of the group, and it may expand or contract according to the owner's movement.

3GPP Network Assisted Group Management

Figure 5:
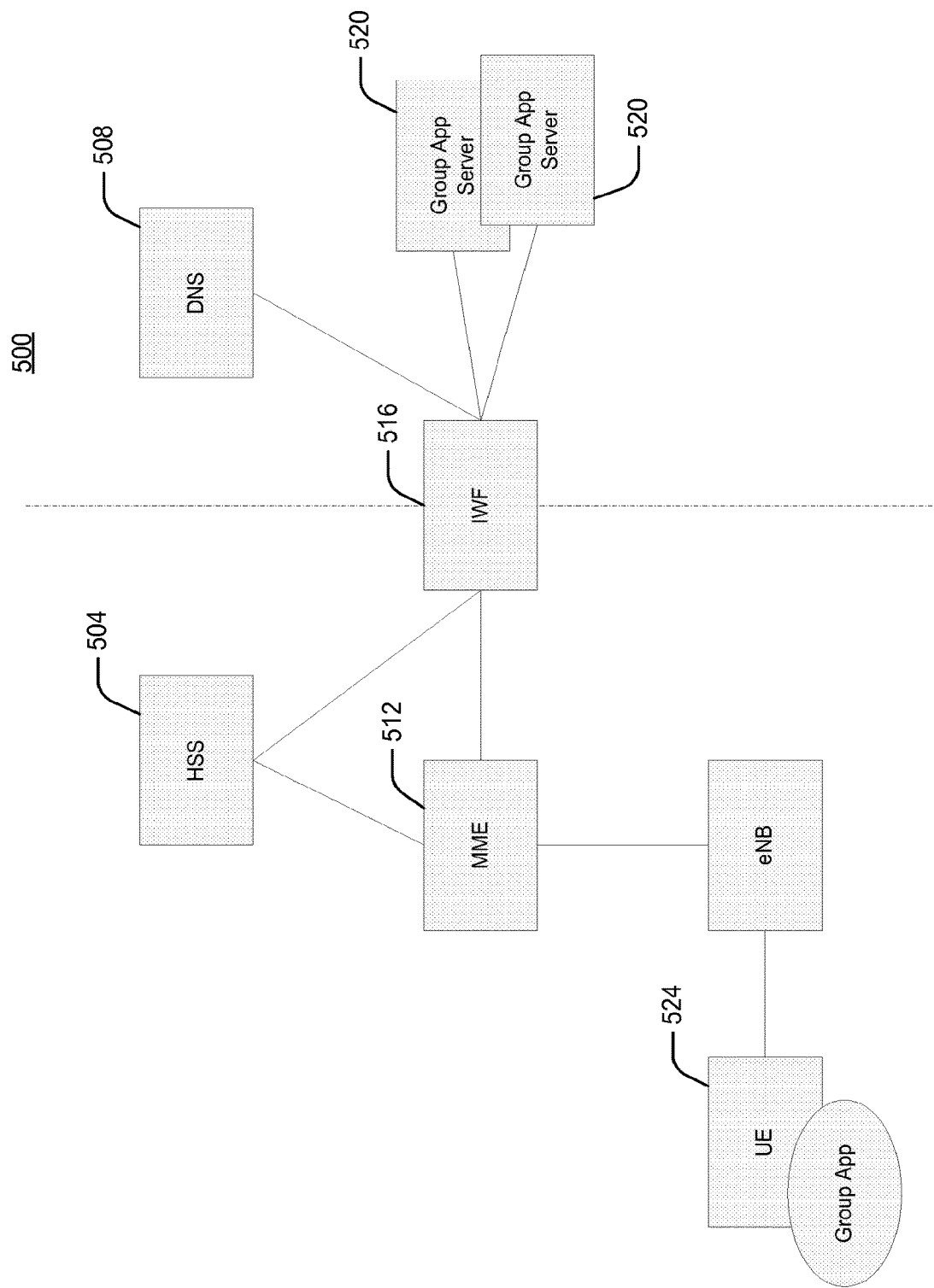
FIG. 5 is a system diagram of an architecture having an IWF entity for group management.

Referring now to FIG. 5, there is shown an embodiment of group management procedure 500. Group management procedure 500 may facilitate communication between 3GPP network 502 and group application servers 520. Group application servers 520 may also be referred to as group communication servers 520. Group management procedure 500 may provide solutions to the problems described herein.

IWF Entity Between 3GPP Network and Group Application Servers

Within group management procedure 500, IWF entity 516 may be provided between 3GPP network 502 and group application servers 520. IWF entity 516 may be a separate physical node, or it may be a logical function in MME 512. Thus, IWF entity 516 may also be referred to as logical node 516. Additionally, IWF entity 516 may be a logical function in any other node in the CN, e.g. HSS 504, MME 512, ProSe server, etc.

The functions performed by IWF entity 516 may include, without limitation, the following. IWF entity 516 may authorize a communication request from 3GPP network 502 or group application servers 520. It may also translate between the 3GPP IDs of UEs 524 and group member IDs. IWF entity 516 may also perform Domain Name Server (DNS) 508 look-ups in order to locate a destination address/port of a particular group application server 520, according to the server name or Uniform Resource Identifier (URI). IWF entity 516 may also locate a destination 3GPP network entity for communication requests from group application servers 520. Additionally, IWF entity 516 may forward a message from 3GPP network 502 to group application servers 520, or vice versa, or concatenate messages from either side to reduce the number/load of messages.

Interfaces for IWF entity 516 may include, without limitation, IWF-MME, IWF-HSS, IWF-DNS, IWF-group application servers, and IWF (home network)-IWF (visited network), or any other type of interface.

3GPP Network Assisted Status Update

Figure 6:
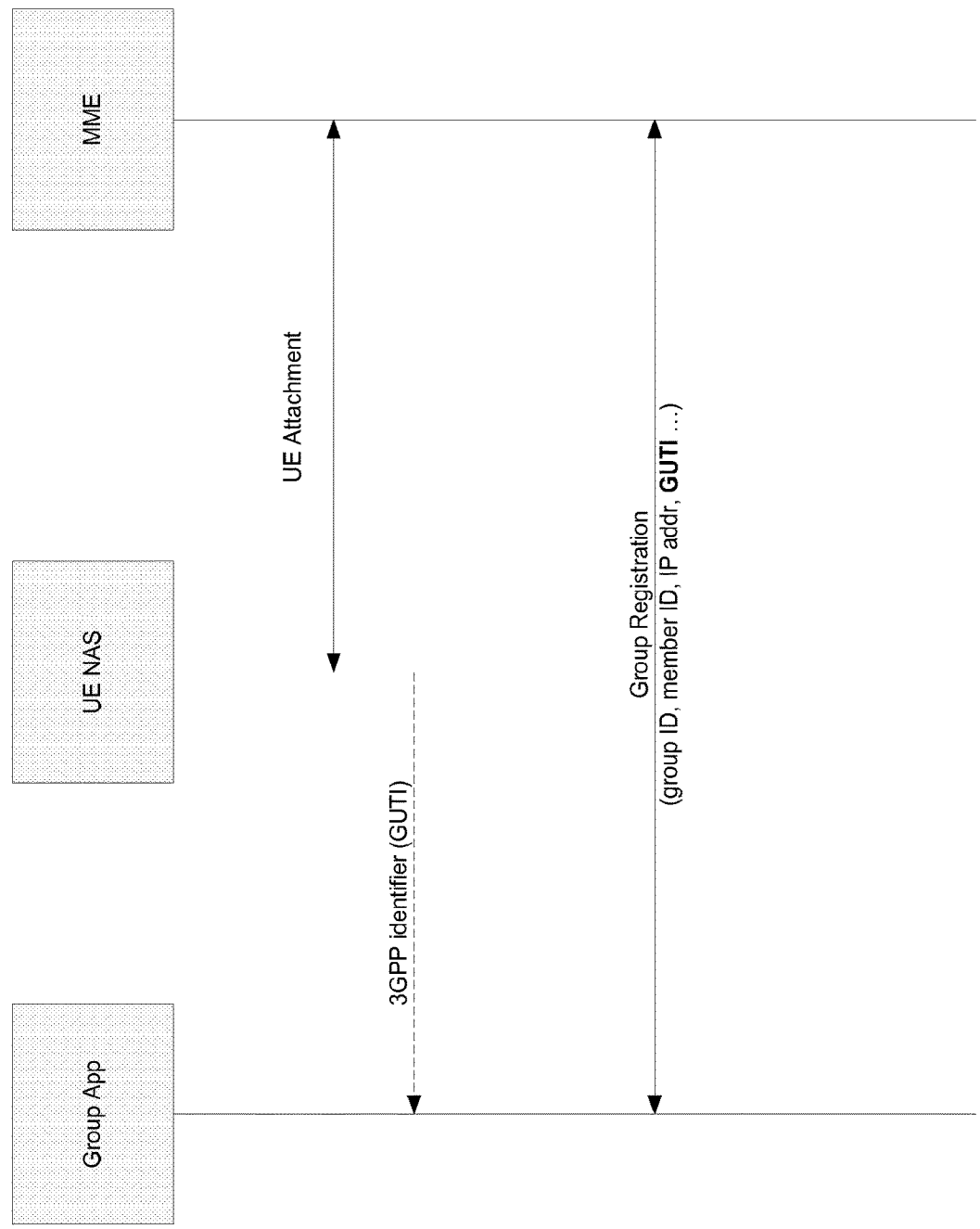
FIG. 6 is a diagram of an example group registration procedure with a 3GPP identifier.

Referring now to FIG. 6, there is shown group registration procedure 600. For a group user, a profile stored in an HSS/HLR may indicate its status as a group user. Optionally, it may indicate any pre-configured group names/identifiers and respective group member IDs. Additionally, an MME may retrieve its group subscription data during the UE's attachment or registration procedures (e.g., TAU/Routing Area Update (RAU)/Location Area Update (LAU)). The UE may also indicate its group communication capability and, optionally, the preconfigured group names/identifiers and respective group member IDs in the UE's attachment or area update NAS messages. The group communication capabilities may include, but are not limited to, the following capability information. The information may include whether the UE supports multicast group communication, whether it supports device-to-device communication (without network coverage), and the media type it supports for group communication (voice, data, video, etc.). The information may also include the maximum number of groups supported, whether it can provide geographical information (e.g., GPS coordinates) for group communication, and the authentication/authorization method it supports for group communication.

Additionally, a UE may have some form of 3GPP identifier(s) in its application layer group registration message. The 3GPP identifier(s) may be stored in the group application server. The 3GPP identifier may serve as an index to locate a corresponding group member when the 3GPP network contacts the group application server and updates the status of a user. A 3GPP identifier that may be used in a group registration message may, without limitation, be one or a combination of the following: Integrated Services Digital Network (ISDN) number, System architecture evolution Temporary Mobile Subscriber Identity (S-TMSI), Globally Unique Temporary ID (GUTI), or International Mobile Subscriber Identity (IMSI).

Upon a change of 3GPP identifiers, for example, due to the GUTI reallocation procedure, the group communication application in the UE may be notified. The UE may consequently initiate a registration update with the application server. It may also be possible for an already registered user to re-register from another device, and update the registration information with a new 3GPP identifier. The application logic may determine whether the new 3GPP identifier overrides the old one. Alternately, the same user can be registered on the multiple devices at the same time.

Additionally, after the user successfully registers with the group application server, the UE may update the related group information in the MME for the corresponding UE context via a NAS procedure. The related group information may include, without limitation, the registered groups, the corresponding member IDs, the corresponding group communication server URIs or IP addresses/ports, or other useful information.

In case of periodic group registration, the UE may not be required to update the MME context each time there is a group registration. However, registrations may be performed if there is a change in the related information. For example, if a UE/user fails to register or has been de-registered with a group, the UE/user may remove the group from the registered group list in the MME context.

The UE may also be required to periodically update the group registration information with the MME. The MME and the UE may negotiate a timer for period updates and, if the timer in the MME expires but the period update has not been received, the MME may decide to remove the stored registered group information.

When a UE performs a TAU with a new MME, it may include any information in its update message if it has further information. An existing TAU message may be extended to carry such group registration information, or a new NAS procedure may be designed for this purpose.

Figure 7:
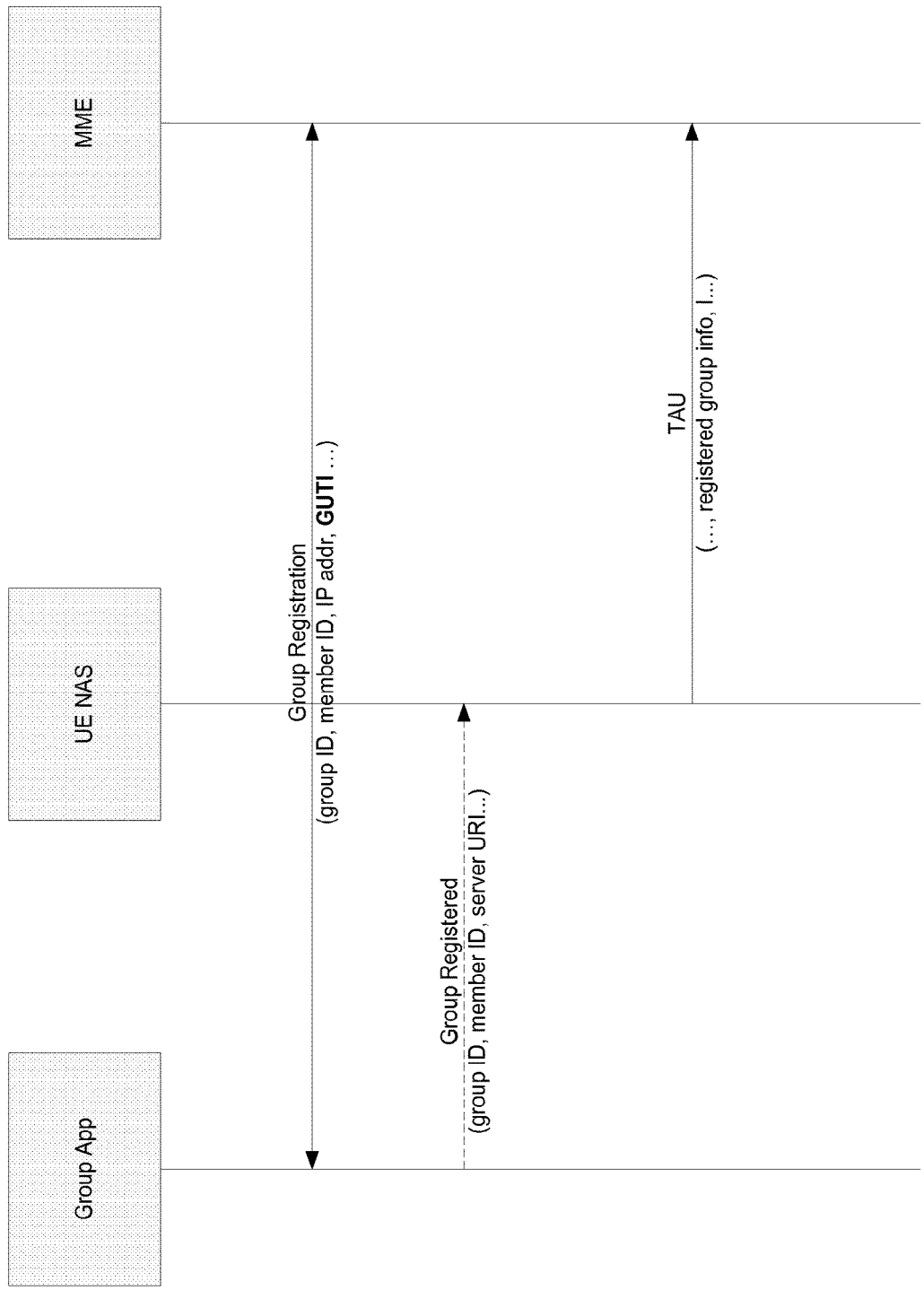
FIG. 7 is a diagram of an example Tracking Area Update (TAU) procedure for registering group information.

Referring now to FIG. 7, there is shown group invitation procedure 700. In the first step of group invitation system 700, a group registration invitation may be sent to a group application running on a UE. The group registration may be sent via an IWF entity and a 3GPP network. A group registered indication and a TAU may be provided. The 3GPP network may contact a group application server to notify the server if there is a change in the UE's status. This may affect the user reachability. Accordingly, one or more of the following may occur: the UE may be detached, the UE may re-attach, the UE may have selected another RAT (which may or may not support group communication), the UE may have moved to an area that does not support group communication or some group communication features (e.g., multicast), or there may have been multiple paging failures.

Figure 8:
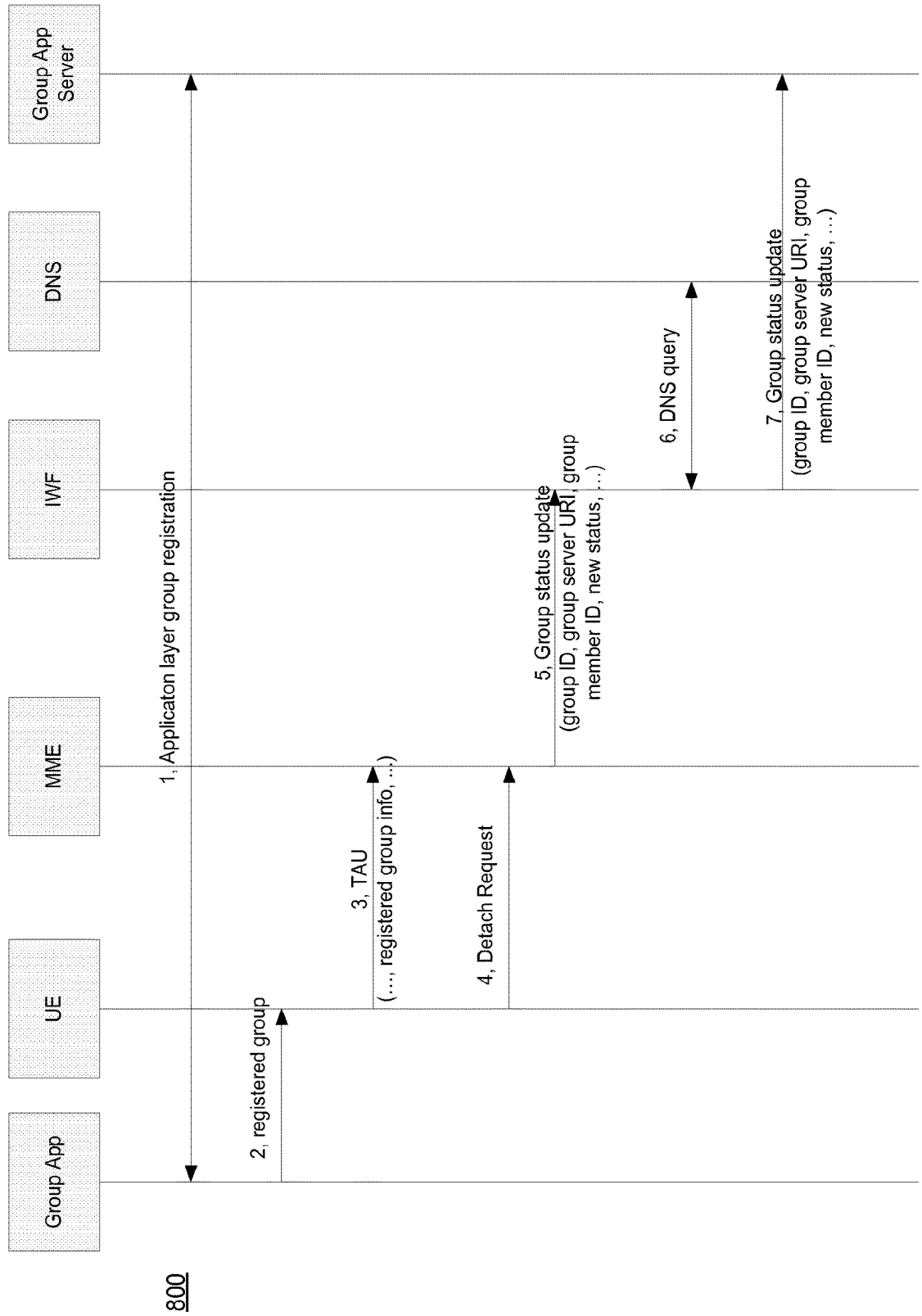
FIG. 8 is a diagram of an example MME communication with a group server by way of an IWF entity to update a user status.
Figure 9:
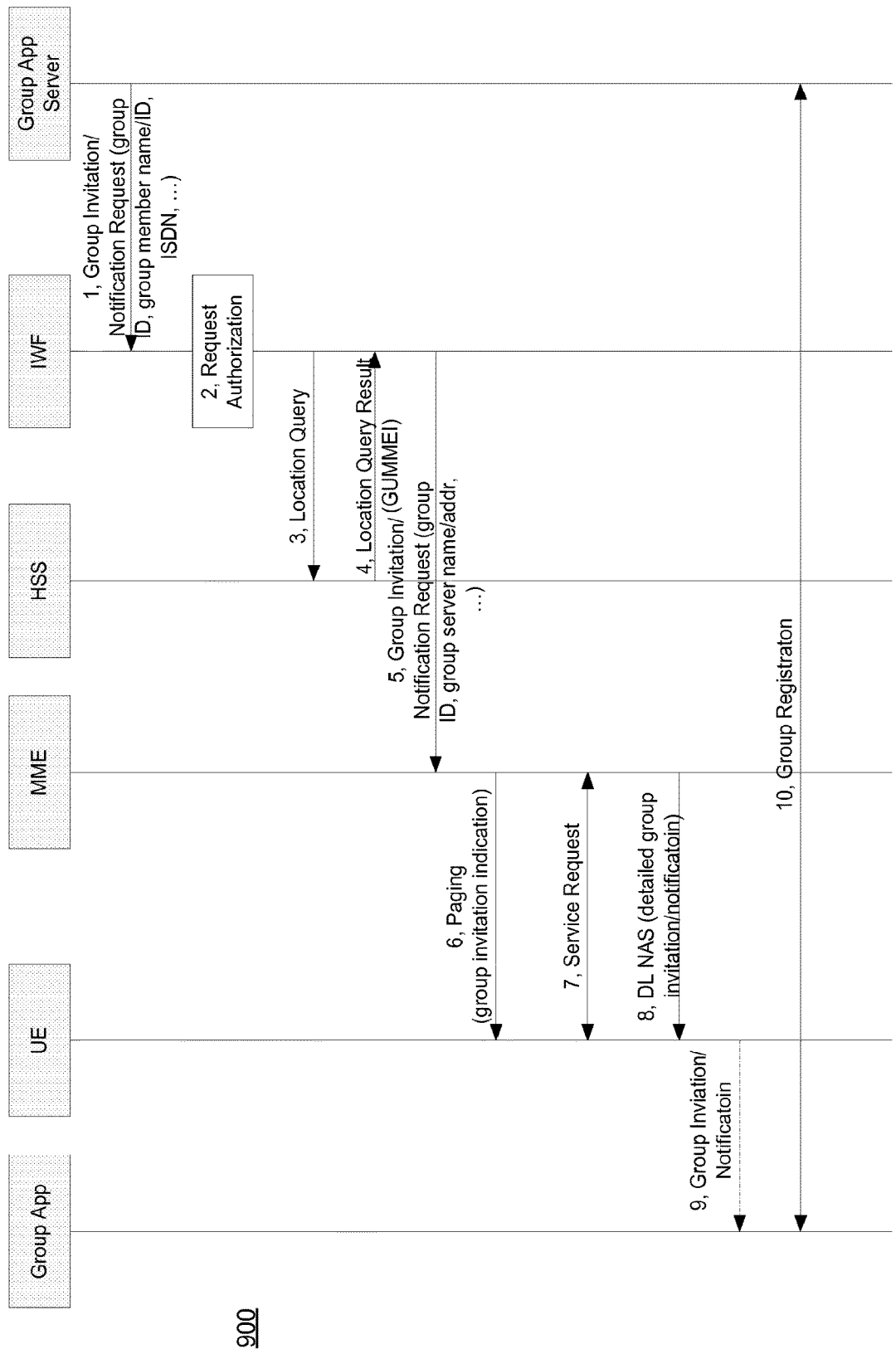
FIG. 9 a diagram of an example group invitation being sent to the UE via the IWF entity and a 3GPP network.

Referring now to FIG. 8, there is shown MME communication procedure 800. In MME communication procedure 800, an MME may communicate with a group application server by way of an IWF entity to update a user status. This update may occur, for example, when a detachment is detected. The group server may also be referred to as a group application server.

The group application in the UE may register with the group application server. This may be an application layer procedure, and may be transparent to the 3GPP network. Additionally, the group application may notify the UE (for example, the NAS layer) that it has registered/joined a group. Information about the registered group, such as the group ID, group member ID, group server name (e.g., Fully Qualified Domain Name (FQDN), Uniform Resource Identifier (URI), etc.), group server address (IP address/port number), or any other information, may be provided to the UE.

Furthermore, the UE may update the MME with the registered group information. The MME may store the information in the UE context. This procedure may be combined with, for example, an existing TAU procedure or other NAS procedures. A specific NAS procedure may be designed for this purpose.

If the UE detaches from the network when the detach request is received, and/or the UE has already registered with a different group application server, the MME may send a group status update message to the IWF entity. In the group status update message, the group information may be provided. This information may include, for example, the group ID, the group member ID, the group server name/address, etc. It may also include any new status information (e.g., "Not Reachable"), the reason for status change (e.g., "Detach"), etc.

If the group server address is not provided in the group status update message, the IWF entity may query the DNS with the group server name. Thus, the IWF entity may obtain the destination address/port of the concerned group application server. The IWF entity may forward the group status update message to the appropriate group application server. The group application server may update its records accordingly.

3GPP Network Assisted Group Invitation/Notification

As described herein, the group application server may not be able to reach a group member. In this case, the group application server may involve the 3GPP network to forward an invitation or notification to the user. Accordingly, the user may start to register/join the group. The ways that the 3GPP network may send an invitation/notification to the group user may include, but are not limited to, by paging, by DL NAS message and by SMS.

UE location reporting may be used by the network to optimize an MBMS broadcast region, to activate/deactivate the downstream EPS controlling nodes, and/or to determine whether the user may be in a subscribed GCSE service area. The service areas for different groups may be different, and the number of cells transmitting the group communication may also be different, at different times. A configuration for triggering the UE to initiate location reporting/transition to RRC-CONNECTED may be provided by, for example, the network provisioning the UE with a list of cells. The cells may define a boundary of group communication distribution. A UE1 may report itself in the boundary region based on the configuration. A Broadcast Multicast Service Center (BM-SC) may activate MBMS bearer(s) in additional downstream nodes which control neighboring MBSFN areas. A UE2 located in the same area at a later time, based on the same configuration, may repeat the same procedure, even though it may no longer be necessary. In order avoid this, the group application server may not perform unicast communication with all group members to change boundary configurations.

The configuration for the UE to report its location may include a transmission on the MBMS resources. In one embodiment, the configuration message (e.g., application level) may be transmitted in the Multicast Traffic Channel (MTCH), with the same Temporary Mobile Group Identity (TMGI) as that of the GCSE group, along with an MBMS session ID. The presence of the message may imply that the group communication for the TMGI is configured for the MBSFN area. This may thus prevent an idle UE from contacting GCSE AS when group communication is silent. The MBMS session ID may implicitly represent the version of the configuration message (similarly, in File Delivery over Unidirectional Transport (FLUTE)), different session IDs may represent different files). This may prevent UE reads of MTCH, or even Multi Cast Channel Control (MCCH), if the location reporting configuration has changed based on an existing MBMS notification mechanism. A boundary configuration may be changed by changing the broadcasted configuration message. This may prevent the re-configuring of UEs which are not in the area. The configuration may only need to convey information relevant to the area, rather than all possible locations the group may operate in.

The configuration message may contain a code similar to the Tracking Area Code (TAC), which may be described by the application/BM-SC/PLMN. The code appearing in the message may not match the code(s) remembered by the UE, since the last contact with the GCSE AS may trigger the UE to contact the GCSE AS.

Signaling the UE EPS Location

The GCSE AS may obtain the location of the UE EPS in multiple ways. Location change reporting may be configured for a GCSE PDN connection. By transitioning to EPS Mobility Management (EMM)-CONNECTED, the UE may trigger location reporting to the PGW of the GCSE PDN connection. Based on the event trigger configured for the IP-CAN, the PGW may report the location of the UE to the UE's Policy and Charging Rules Function (PCRF), and subsequently to the GCSE AS. The PCRF of the UE may indicate whether the location is permitted by the UE's subscription for GCSE. The GCSE AS may not be able to make sense of the EPS location information of the UE, and it may transfer the information to the group PCRF for the (group id, PLMN). The group PCRF may indicate whether the location is permitted for group communication. If permitted, the group PCRF may contact BM-SC for updating MBMS delivery areas.

Alternatively, the UE location may be reported to the GCSE AS via application signaling (e.g., a code indicated in the location reporting message described herein). The AS may decide on its own whether such a location is permitted for GCSE. Alternatively, the AS may base the determination on the IP address of the UE, the PLMN and its group identity, to contact the PCRF for the UE, and/or the PCRF for the (group id, PLMN), in order to authorize and set up MBMS resources appropriately with the location information.

Group-Independent MBMS Relay

A UE capable of eMBMS reception may announce itself as a MBMS UE to a network relay. Upon associating with a relayed UE, or during an announcement, the relayed UE may declare which PLMN it is registered to. The GCSE UE monitoring the TMGI of the same PLMN may register with the relayed UE for receiving the traffic and/or control message of the interested TMGI. After registration, the relayed UE may respond to a counting request containing the TMGIs that the relayed UE has registered with. The relayed UE may not participate in the GAA/GBA/MIKEY procedures with the BM-SC for the relayed TMGI.

During registration, the relaying UE may provide at least an IP address to the relayed UE for transporting application layer signaling directly between the relayed UE and GCSE AS/BM-SC. The relayed UE may use the IP address provided by the relay UE to transport application layer signaling directly. Alternatively, for the sake of session continuity/PCC interaction, the relayed UE may invoke Dual Stack Mobile IPv6 (DSMIPv6) or other EPS supported MIP mechanism to transport signaling between the relayed UE and GCSE AS/BM-SC. For example, the inner IP address may be the EPS address assigned by the PGW of a GCSE PDN connection. Additionally, the outer IP address may be assigned by the relay UE. The PGW for the relayed UE may report the outer IP address to the PCRF/AS for determining the location of the relay UE.

Upon receiving MBMS traffic, the IP packet may be relayed to the UE. The relayed UE may have performed the Generic Authentication Architecture (GAA)/Generic Bootstrapping Architecture (GBA)/MIKEY procedure with BM-SC/GCSE AS via application layer signaling by IP transport offered by the relay UE. The relayed UE may be able to decrypt/authenticate any SRTP/SRTCP packets generated by BM-SC/GCSE-AS.

3GPP NAS Layer Group Management

The methods described herein may enable group management via 3GPP NAS signaling. It will be understood that the term UE may also refer to the user unless explicitly mentioned otherwise. Moreover, the disclosure herein may apply to both ProSe group communication and GCSE.

Modification of User Subscription Information

The ways that the user subscription information may be updated may include, but are not limited to, any one or more of the following. The subscription information may be updated to indicate whether a UE may be allowed to participate in group communication. If so, it may be updated to indicate which groups or applications may be allowed for the UE. It may also indicate whether a UE is allowed to be a group owner, or whether the UE may be allowed to dynamically create a new group, add members to a group, delete members from a group, or any combination of the disclosed actions. The subscription information may also be updated to indicate whether a UE may be allowed to delegate group ownership to another UE, or whether the UE may be allowed to request a notification about the number and the status of group member UEs. It may also be updated to indicate whether a UE may be allowed to leave a group without notifying the network, the group members or the group owner/administrator. Furthermore, it may be updated to indicate whether a UE may be allowed to transmit only, receive only, or transmit and receive to and from other group members, and whether a UE may be notified when it gets added to a group, and/or whether a UE's consent may be required to be added or removed from a group. Additionally, the subscription information may be updated to indicate whether a UE can modify or suggest a name for a group that may be created or modified. Furthermore, any of the foregoing may be added for inter-PLMN cases, e.g., the subscription information may be updated to indicate whether a UE may be allowed to create a group and add (or remove) UEs from another PLMN. Any of the foregoing may be used in any combination.

Proposed additions to the subscription information may be forwarded by the HSS to the CN node that serves the UE, e.g., the MME and/or the ProSe server. During registration of a UE, the MME may fetch the context of the UE from the HSS. This may include any of the proposed information. For example, the HSS may include any of the above in a new container or Information Element (IE), which may be termed a "Proximity Service IE." A proximity server may be included in the Update Location Acknowledge message that may be sent from the HSS to the MME. Alternatively, the HSS may include the information of other nodes (e.g., the ProSe server) in the system that may request subscription information from the HSS. The listed information may also be configured locally in the MME.

The MME may forward any of the listed information to the UE. This can be done by including new IEs in any NAS messages. For example, a ProSe IE may be included in an Attach Accept or TAU Accept message that may be sent to the UE. Furthermore, the MME can use the EMM Information (NAS message) to send any of the listed information to the UE.

The MME may also transmit any of the disclosed information to the eNB for at least two purposes. First, such a transmission may be a method of delivering information to the UE. Second, the eNB may use the transmission to manage group operations if the control is anchored at the eNB.

Thus, upon reception (e.g., from an MME) of any information (such as the information listed herein) for group management, the eNB may perform any of the following actions. The eNB may forward the information to the UE by way of existing or new RRC messages. For example, the eNB may send a ProSe IE container in an existing RRC message, such as an RRC connection reconfiguration. Additionally, the eNB may maintain the provided information (e.g., the MME may provide the information to the eNB via a new or existing S1AP message), so that it may control the group management and communication. This may assume that group communication and management may be an eNB responsibility in coordination with the UEs. For example, the UEs may request that the eNB create a group for communication, and a location where the involved UEs may be served in the same eNB. Thus, based on the received information, the eNB may accept or reject requests from the UE.

Additionally, the UE may send new or existing RRC messages to indicate a desire to create a group, or to modify the membership of the group. For example, an RRC message may be an indication to delete members of the group, to modify any other communication aspects of the group, etc. The eNB may accept or reject the request, based on the received subscription information or local configuration information. The eNB may also respond with a new or existing RRC message. This may indicate the result of the request, and a cause code that explains the reason the result is reached.

Disclosure with respect to group management herein may be described between a UE and a MME. However, it will be understood that the disclosure may apply equally well to interactions between a UE and an eNB (e.g., the eNB may be considered the entity that is responsible for enforcing rules and policies for group related communication and management). However, in this case, the UE and eNB interactions may be performed over RRC messages (or lower layer signaling, e.g., MAC signaling). Therefore, the types of information and/or action taken by the UE and MME for group management may also apply to the case where interactions take place between a UE and the eNB (e.g., over RRC or lower layer signaling).

Furthermore, the UE may indicate its capability and/or local configuration (if any) to operate in group communication. Moreover, the UE may indicate its capability and/or configuration to perform any of the operations or process any of the information, listed herein. For example, during an attach procedure, the UE may indicate its capability and/or configuration to operate in group communication. Moreover, it may have configurations for operating as a group owner. It may also have configurations for adding or deleting members of the group, etc.

UE and Network Interaction for Group Management

Many procedures and types of signaling may be performed between the UE and the network for the purpose of group management, as described herein. While the procedures may be described with reference to the UE and the MME, both of which may use the NAS protocol for communication, the procedures may also apply between the UE and any other nodes in the system. For example, they may apply between an eNB and a ProSe server. The protocol that may be used may be adapted/modified to include any of the information or indications that may be proposed for UE and MME communication. Moreover, the actions taken by the MME due to a reception of any of the proposed indications (requests, etc.) may also be applied to other nodes that may receive the disclosed indications, requests, etc. For example, if a UE sends a request to delete a group member using a new or modified NAS message, and the MME deletes the target member(s), then similar procedures may apply if the UE communicates with another entity, such as the ProSe server.

UE Behavior/Procedures for Group Management

A UE may be configured to initiate any of the following procedures. Furthermore, a UE may perform any of the following procedures after it has received rules and/or policies which indicate that the procedures may be performed. The rules/policies may be provided via the NAS (e.g., by the MME), or the information may be provided to the UE via ANDSF, OMA DM, SMS, or other higher layer methods, e.g., at the application layer using application-specific signaling. Additionally, rules/policies may be provided by the ProSe server using a communication protocol that may be in place for UE and server communication (user and/or control plane), e.g. a PC5 interface which exists between the UE and the ProSe server.

Sending a Group Management Request to a Network

A NAS procedure may be used for the purpose of handling group management. A NAS message may be referred to as Proximity Service Request, which may be initiated from idle or connected mode, i.e., the message may be sent as a first UE NAS message. The message may include a field indicating that the purpose is group management. For example, the request may be used to create a group, add a UE member, remove a UE member, etc. Moreover, the UE may indicate the identity of the target UE(s) that may be affected by the request. A target UE ID may be a proximity ID that the sending UE may be aware of, or any other ID (possibly an application layer user ID) that the source UE may use to identify the target UE(s).

Furthermore, the sending UE may identify the applications (e.g., using application IDs) for which the request is sent. This may be used by the recipient node (e.g., MME or proximity server) to verify whether the request can be granted, as the operator may have different rules for different applications. The disclosed messages may also be used for other purposes, e.g., to request a list/number of active UEs that may be part of an identified group. The functionality may also be implemented using existing NAS messages. However, this may require the addition of new fields to request specific actions, e.g., to create a group, to delete UEs from a group, etc. The UE may also indicate a priority level of the group for which a request may be made. For example, based on an event, user input, local configuration or group identifier/application, a UE may indicate that the request has a high priority. This may trigger the recipient node (e.g., MME) to execute the procedure without necessarily verifying all of the conditions that would normally be verified for other normal priority requests.

The UE may also include a name of the group for which the request is sent. The name may be a human readable name. The recipient node (e.g., the MME) may save the name in the group content. It may forward the name to the other UEs once they become members. The UE may also use the name to display to the user any information related to the group. Moreover, the requests (e.g., to create a group, delete UEs, add UEs, request the number of active UEs in a group, request notification when a UE enters or leaves a group, etc.) may be sent to a proximity sever or any other node (e.g., application server).

Sending a Group Management Request to the Network

A UE may send a request for group management to the network (e.g., an MME, a proximity server, an application server, a MuSe entity, etc.) when any of the following occurs. For example, the UE may send a request when it receives an explicit indication that the network supports group communication, when it receives an explicit notification to initiate the request via ANDSF, OMA DM or the application layers, or when it receives an explicit indication to do so from the proximity server. The UE may also send a request for group management to the network when the UE activates an application that may be used for group communication (Prose or GCSE), when the user inputs (via the user interface) a request to start a group communication, or for creating a group, modifying a group (adding, deleting), etc. Additionally, the UE may send such a request when the UE enters group communication mode (via configurations, indications, or via hardware inputs), for public safety cases, or when the UE enters an area where group communication may be supported. Additionally, the UE may send request for specific applications.

Areas supporting group communication which the UE may enter and send a request may be, for example, an eNB, a cell, a group of cells, at least one tracking area (code), CSG, etc. Moreover, the UE may know about the support from preconfigured information that indicates the support of the service in an area from broadcast notifications it may receive. The UE may also know about the support from dedicated notifications it may receive in NAS or other layer messages.

MME Behavior Upon Reception of Group Management Requests

Any node (e.g., MME, proximity server, etc.) that receives a group management request may respond. The request for group management may be received from a UE, a MuSe, a ProSe Server, GCSE AS or any other nodes in the system.

MME Verifies the Network Rules and Policies

Upon reception of the request, the MME may perform any of the following actions. It may determine whether the requesting entity is allowed to send requests for group management (or communication), where the request to create a group originated, whether to delete a group, add a group member, delete a group member, or modify membership or parameters (e.g., QoS, priority, etc.) of the group communication, etc. The MME may verify the subscription information to determine whether the requesting UE is allowed to have the request granted, where the sending UE may be, or which UE(s) may be affected by the request. The MME may also verify with another node (e.g., a ProSe server, a MuSe, etc.) whether the request can be granted. Optionally, it may verify the foregoing for the requesting and/or target UEs, for the specific application, etc. It may also verify whether the group ID is valid or allowed to have such a request granted. Additionally, the MME may verify whether the indicated application is allowed to have such a request granted, or whether the request may be granted for inter-PLMN cases. Any combinations of the foregoing verifications or other verifications may be performed. Furthermore, the verifications and combinations of verifications may be performed by any other nodes, e.g., a ProSe server. When the foregoing verifications are performed by nodes other than the MME, the same network rules and policies may apply.

MME May Accept the Request

If a request is accepted by the network (e.g., based on a verification such as those listed herein), the MME may perform the following actions. When a request to create another group is received, the MME may update the UE context to include the newly formed group. Moreover, the MME may maintain an indication that the UE is the group owner/administrator (if this is allowed or is actually the case). If the group owner is another UE, the MME may maintain information that this is the case. Alternately, the MME may update the context of the group owner's UE context to indicate ownership of the group.

The MME may also assign a group ID to the requested group. This information may already be included in the request. The MME may also inform another node in the system about the creation of the group, e.g., the MuSe, the ProSe Server, etc. Moreover, the MME may indicate which of the other UEs are members or may be allowed to be members of the group. The MME may use any listed UEs in the request, or the MME may obtain configurations locally (or, e.g., information downloaded from the HSS) that may indicate the UEs which may be affected by the request (e.g., a list of UEs that may be allowed to be members of the group).

The ProSe server (or the MuSe) may inform the group application server about the request to create a group (or the granting of group creation). It may also include the assigned group ID. The application server may acknowledge the indication to the MME or the ProSe Server. It may also provide a list of UEs that may be allowed for the created group. The ProSe server may acknowledge the indication, and may also provide a list of UEs that may be allowed for the created group. Optionally, the list of UEs allowed for the group may be based on a list of UEs provided by the ProSe server. The application server (or ProSe server or MuSe) may contact the UEs that may be allowed to be part of the group to inform them about the creation of the group. Hence, each UE may choose to join the group. The application server (or ProSe server or MuSe) may also indicate the application name, the group ID, the group owner's identity, etc.

Moreover, the application server (or ProSe server or MuSe) may indicate any of the following information about the group. It may indicate, for example, the media type that may be allowed for the group, the group priority, the maximum number of participants, whether the WLAN may be used, and/or whether IP flows can be used on multiple RATs (e.g., audio on 3GPP RAT and video on WLAN, etc.). It may also indicate whether the recipient UE is allowed to transmit, receive, or act as a group owner. It also may indicate the parameters related to floor control, e.g., there may be a time pattern during which a UE may have a specific slot to send data. The application server (or ProSe server or MuSe) may indicate any other information.

The MME may contact other UEs that may be allowed/ supposed to be members of the group, in order to indicate the formation of the new group. The information may be according to MME information. It may be local, as downloaded from the HSS, or as indicated by the application server or ProSe server. The MME may use a new NAS message, or an existing NAS message. An existing NAS message may be updated to include these and/or other indications for group management. The MME may also include any other information about the group/UEs as listed herein (media type, priority, etc.).

The MME may respond to the source (i.e., the requesting) UE to indicate the acceptance of the group creation. The MME may also include (or confirm if previously provided by the UE) the group ID, and any other information about the group as described herein (e.g., group priority, whether the UE may be a group owner, etc.). The MME may also indicate the number and IDs of the UEs that may be active (or registered in the system). Additionally, the MME may indicate which UEs may be allowed to be part of the group, and which UEs may not. For example, based on the information at the MME and a previously provided (e.g., from the source/requesting UE) list of target UEs, the MME may indicate which subset of UEs may be allowed to be part of the group. This information may also be provided to the MME from the ProSe server, the MuSe or the application server. The MME may also indicate which UEs may not yet be registered to the system.

If the request is to delete a group, the MME may update the UE's context to remove the related information of the group indicated in the delete request message. The MME may also take actions such as the following. The MME may inform another node in the system about the deletion of the group, e.g., a MuSe, a ProSe Server, etc. Moreover, the MME may indicate the other UEs that are members of the group. The MME may communicate with any listed UEs in the request, or the MME may have configurations locally (e.g., information downloaded from the HSS) that indicate the UEs which may be affected by the request (e.g., a list of UEs that may be members of the group)

The ProSe server (or the MuSe) may inform the application server about the request to delete a group (or the granting of a group deletion). It may also include the group ID to be deleted. The application server may acknowledge the indication (e.g. to the MME or ProSe Server), and may also provide a list of UEs that may be affected by the group deletion. The ProSe server may also acknowledge the indication, and/or may provide a list of UEs that may be affected by the group deletion. The list of UEs may optionally be based on a list of UEs provided by the ProSe server. The application server (or the ProSe server or MuSe) may contact the UEs that may be members of the group to inform them about the deletion of the group.

The MME may contact other UEs that are supposed to be members of the group, or allowed to be members of the group. This may be determined according to MME information. The MME information may be local, as downloaded from the HSS, or as indicated by the application server or ProSe server to indicate the deletion of the group. The MME may use a new NAS message. It may also use an existing NAS message which may be updated to include this and/or other indications for group management.

The request may be for a notification regarding active members, or for a notification regarding when UEs enter or leave a group. The UE may forward the request to the ProSe server or the application server, so that when a UE joins the group, the ProSe server or the application server may send a notification to the MME, and the MME may update the UE's context accordingly. The MME may also directly request that the UEs that are allowed/supposed to be group members notify the MME when they join the group. The notification request can be combined with the NAS message for new group creation or a separate NAS message. The notification from UE may be also by way of a NAS message.

Priority and Preemption Handling

In one embodiment, information such as the QCI, the priority level, the pre-emption capability, and the pre-emption vulnerability of a user within a GCSE group may be assigned on a user basis. The bearer mapped to the DL communication traffic may have a different QCI, a different priority level, a different pre-emption capability, or a different pre-emption vulnerability, etc., from that of the bearer mapped to the unicast UL communication traffic. In another embodiment, the QCI, the priority level, the pre-emption capability, the pre-emption vulnerability of a user within a GCSE group, etc. may be assigned on a per UL unicast traffic bearer basis. These bearer attributes may be different for different users involved within the same group communication instance. The eNB may prioritize users on a per bearer basis using the allocation and retention priority characteristics of the bearer mapped to the unicast UL traffic. In one embodiment, the scope of priority level, pre-emption capability and pre-emption vulnerability values may be set to span both group communication bearers and non-group communication bearers. It may be set for both UL traffic and DL traffic. In another embodiment, the eNB may prioritize the group communication bearers over non-group communication bearers. Special or reserved QCI may be assigned to group communication bearers, i.e., bearers that may be mapped to downlink group traffic, or bearers that may be mapped to unicast traffic in UL or DL, in support of group communication.

References relevant to the disclosure herein may include 3GPP TR23.768, 3GPP TS 22.468, 3GPP TS 23.041, 3GPP TS 36.440 and TS 22.246 Multimedia broadcast/multicast service (MBMS); Architecture and functional description.

A communication method includes providing an attachment between a group member of a communication group and a group communication system, detecting a detachment between the group member and the group communication system, and reestablishing the attachment between the group member and the group communication system according to a 3GPP system. An indication of group availability is provided to the group member by the group communication system. The GPP system determines the location of the group member, and reestablishes the attachment according to the determined location. The 3GPP system transmits the determined location to the group communication system, and the group communication system reestablishes the attachment according to the transmitted location.

A broadcast region is optimized according to the determined location. An EPS node is activated according to the determined location. A determination is made whether the group member is in a subscribed group service area according to the determined location. The group member is located within a group service area. When a plurality of group members is included within the group service area, at least two group members of the plurality of group members attach to different group communication systems.

The group communication system notifies the group member when the group member enters the group service area. A group application within the group communication notifies a group application within the group member. The group service area includes a GUID. The GUID is broadcast by the group member or a group system. The group member broadcasts the GUID to the group communication system. Group members of a plurality of group members broadcast the GUID to each other. When the group member cannot translate the GUID, a group application server translates a global identifier, and provides the translated GUID to the group member.

The group service area expands and shrinks according to a number of group members located within the group service area. The group service area expands and shrinks according to a location of the group member. The group service area includes a plurality of local home networks. The group service area includes a plurality of tracking area identifiers. The group service area includes a cell from each of a plurality of PLMNs. The group service area includes a cell from each of a plurality of CSGs. The group service area includes a cell from each of a plurality of MBSFN areas. The group communication system comprises a GCSE. The group member and the group communication system include respective group applications.

An attachment is provided between the respective group applications. The attachment between the group member and the group communication system is reestablished according to an EPS. The attachment between the group member and the group communication system is reestablished according to a MuSe functionality. The group member detaches from the group communication system according to a selection by the group member of a RAT network that does not support group communication. The group member detaches from the group communication system according to a movement of the group member from a group service area.

A logical node is provided between the group communication system and the 3GPP system. The logical node includes an IWF entity. The IWF entity authorizes a communication request from the 3GPP system. The IWF entity performs a translation between a 3GPP group member identifier and a group member identifier. The IWF entity performs a DNS look-up to locate an address of the communication group server. The IWF entity locates the 3GPP system for a communication request from the group communication system. A communication is forwarded from the group communication system to the 3GPP system according to the locating. The group member is located within a cell of the group service area. The cell has a cell identifier. The group communication system reestablishes an attachment according to the cell identifier. The cell has a 3GPP identifier. The attachment is reestablished according to the 3GPP identifier.

In one or more representative embodiments, an apparatus, which may include any of a receiver, a transmitter and a processor, may be configured to perform a method. In one or more representative embodiments, a system may be configured to perform a method as in at least one of the preceding embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method, performed by a remote wireless transmit receive unit (WTRU), for group communications of a group of WTRUs including the remote WTRU, the method comprising:
receiving, from a relay WTRU, relay discovery information including information indicating: (1) an announcer of relay services, (2) one or more temporary mobile group identities (TMGIs) associated with the relay WTRU, and (3) a network identifier (ID) associated with the group of WTRUs;
transmitting, to the relay WTRU, relay monitoring information including information indicating one or more of the TMGIs for which the remote WTRU requests monitoring by the relay WTRU; and
receiving the group communications associated with the indicated one or more TMGIs associated with the relay WTRU, wherein the group communications are transmitted from a base station (BS) via the relay WTRU to the group of WTRUs.

2. The method of claim 1, comprising transmitting one or more group IDs via any of a broadcast message, RRC signaling, and NAS signaling,
wherein the one or more group IDs are received from any of a base station, a mobility management entity (MME), a group application server, and a ProSE server, and
wherein the one or more group IDs are layer-2 group IDs used by a group application layer.

3. The method of claim 2, comprising using any of different pre-emption vulnerabilities and different pre-emption capabilities for each of the group communication bearer and the non-group communication bearer according to the first and second priority levels.

4. The method of claim 1, comprising receiving the group application layer ID from any one of a base station, a mobility management entity (MME), a group application server, and a ProSE server,
wherein the one or more group IDs map to a group application layer ID.

5. The method of claim 1, comprising:
communicating via a group communication bearer having a first priority level for allocating resources to the group communication bearer; and
communicating via a non-group communication bearer having a second priority level for allocating resources to the non-group communication bearer, wherein the second priority level is different from the first priority level.

6. The method of claim 5, wherein the first priority level is higher than the second priority level.

7. The method of claim 5, comprising using different Quality Control Indexes (QCIs) for each of the group communication bearer and the non-group communication bearer according to the first and second priority levels for any of downlink traffic and unicast traffic.

8. A remote wireless transmit receive unit (WTRU) for performing group communications of a group of WTRUs including the remote WTRU, the remote WTRU comprising circuity including a transmitter, a receiver, a processor and memory, configured to:
receive, from a relay WTRU, relay discovery information including information indicating (1) an announcer of relay services, (2) one or more temporary mobile group identities (TMGIs) associated with the relay WTRU, and (3) a network identifier (ID) associated with the group of WTRUs;
transmit, to the relay WTRU, relay monitoring information including information indicating one or more of the TMGIs for which the remote WTRU requests monitoring by the remote WTRU; and
receive the group communications associated with the indicated one or more TMGIs associated with the relay WTRU, wherein the group communications are transmitted from a base station (BS) via the relay WTRU to the group of WTRUs.

9. The WTRU of claim 8, configured to transmit one or more group IDs via any of a broadcast message, RRC signaling, and NAS signaling,
wherein the one or more group IDs are received from any of a base station, a mobility management entity (MME), a group application server, and a ProSE server, and
wherein the one or more group IDs are layer-2 group IDs used by a group application layer.

10. The WTRU of claim 9, configured to use any of different pre-emption vulnerabilities and different pre-emption capabilities for each of the group communication bearer and the non-group communication bearer according to the first and second priority levels.

11. The WTRU of claim 8, configured to receive the group application layer ID from any one of a base station, a mobility management entity (MME), a group application server, and a ProSE server,
wherein the one or more group IDs map to a group application layer ID.

12. The WTRU of claim 8, configured to:
communicate via a group communication bearer having a first priority level for allocating resources to the group communication bearer; and
communicate via a non-group communication bearer having a second priority level for allocating resources to the non-group communication bearer,
wherein the second priority level is different from the first priority level.

13. The WTRU of claim 12, configured to use different Quality Control Indexes (QCIs) for each of the group communication bearer and the non-group communication bearer according to the first and second priority levels for any of downlink traffic and unicast traffic.

14. A relay wireless transmit receive unit (WTRU) for group communications of a group of WTRUs including a relayed WTRU, the relay WTRU comprising circuity including a transmitter, a receiver, a processor and memory, configured to:
transmit, to the relayed WTRU, relay discovery information including information indicating: (1) an announcer of relay services, (2) one or more temporary mobile group identities (TMGIs) associated with the relay WTRU, and (3) a network identifier (ID) for the group communications for the group of WTRUs;
receive, from the relayed WTRU, relay monitoring information including information indicating one or more of the TMGIs for which the relayed WTRU requests monitoring by the relay WTRU; and transmit the group communications associated with the indicated one or more TMGIs associated with the relay WTRU, wherein the group communications are received from a base station (BS) and transmitted to the relayed WTRU.

15. The relay WTRU of claim 14, further configured to receive one or more group IDs via any of a broadcast message, RRC signaling, and NAS signaling, wherein the one or more group IDs are received from any of a base station, a mobility management entity (MME), a group application server, and a ProSE server.

16. The relay WTRU of claim 15, wherein the one or more group IDs are layer-2 group IDs used by a group application layer.

17. The relay WTRU of claim 15, further configured to transmit the group application layer ID to any one of a base station, a mobility management entity (MME), a group application server, and a ProSE server, wherein the one or more group IDs map to a group application layer ID.

18. The relay WTRU of claim 14, further configured to:

provide a group communication bearer having a first priority level for allocating resources to the group communication bearer; and provide a non-group communication bearer having a second priority level for allocating resources to the non-group communication bearer, wherein the second priority level is different from the first priority level.

19. The relay WTRU of claim 18, further configured to provide different Quality Control Indexes (QCIs) to the group communication bearer and the non-group communication bearer according to the first and second priority levels any of downlink traffic and unicast traffic.

20. The relay WTRU of claim 19, further configured to provide any of different pre-emption vulnerabilities and different pre-emption capabilities to each of the group communication bearer and the non-group communication bearer according to the first and second priority levels.

* * * * *

UNITED STATES PATENT AND TRADEMARK OFFICE
CERTIFICATE OF CORRECTION

PATENT NO. : 11,240,642 B2
APPLICATION NO. : 16/185986
DATED : February 1, 2022
INVENTOR(S) : Ahmad et al.

It is certified that error appears in the above-identified patent and that said Letters Patent is hereby corrected as shown below:

In the Claims

Replace Column 33, Line 13-Column 36, Line 19, (approx.) with the following Claims:

1. A method, performed by a remote wireless transmit receive unit (WTRU), for group communications of a group of WTRUs including the remote WTRU, the method comprising: receiving, from a relay WTRU, relay discovery information including information indicating: (1) an announcer of relay services, (2) one or more temporary mobile group identities (TMGIs) associated with the relay WTRU, and (3) a network identifier (ID) associated with the group of WTRUs; transmitting, to the relay WTRU, relay monitoring information including information indicating one or more of the TMGIs for which the remote WTRU requests monitoring by the relay WTRU; and receiving the group communications associated with the indicated one or more TMGIs associated with the relay WTRU, wherein the group communications are transmitted from a base station (BS) via the relay WTRU to the group of WTRUs.

2. The method of claim 1, further comprising transmitting information indicating any number of layer-2 group IDs,
    wherein the information indicating any number of layer-2 group IDs is received via any of a broadcast message, radio resource control (RRC) signaling, and non-access stratum (NAS) signaling,
    wherein the information indicating any number of layer-2 group IDs is received from any of a base station, a mobility management entity (MME), a group application server providing the group communication services, and a proximity services (ProSE) server, and
    wherein the information indicating any number of layer-2 group IDs is associated with a group application layer associated with the group application server.

3. The method of claim 2, further comprising using any of different pre-emption vulnerabilities and different pre-emption capabilities for each of a group communication bearer and a non-group communication bearer according to first and second priority levels.

4. The method of claim 2, further comprising receiving information indicating a group application Signed and Sealed this
Twenty-second Day of November, 2022

*Katherine Kelly Vidal*

Katherine Kelly Vidal
*Director of the United States Patent and Trademark Office* layer ID from any of the BS, the MME , a group application server, and the ProSE server,
 wherein the any number of layer-2 group IDs map to the group application layer ID.

5. The method of claim 1, further comprising:
using a group communication bearer having a first priority level associated with allocating resources to the group communication bearer for group communications; and
using a non-group communication bearer, having a second priority level associated with allocating resources to the non-group communication bearer,
wherein the second priority level is different from the first priority level.

6. The method of claim 5, wherein the first priority level is higher than the second priority level.

7. The method of claim 5, further comprising using different Quality Control Indexes (QCIs) for each of the group communication bearer and the non-group communication bearer according to the first and second priority levels for any of downlink traffic and unicast traffic.

8. A remote wireless transmit receive unit (WTRU) for performing group communications of a group of WTRUs including the remote WTRU, the remote WTRU comprising circuity including a transmitter, a receiver, a processor and memory, configured to:
receive, from a relay WTRU, relay discovery information including information indicating (1) an announcer of relay services, (2) one or more temporary mobile group identities (TMGIs) associated with the relay WTRU, and (3) a network identifier (ID) associated with the group of WTRUs;
transmit, to the relay WTRU, relay monitoring information including information indicating one or more of the TMGIs for which the remote WTRU requests monitoring by the remote WTRU; and
receive the group communications associated with the indicated one or more TMGIs associated with the relay WTRU, wherein the group communications are transmitted from a base station (BS) via the relay WTRU to the group of WTRUs.

9. The remote WTRU of claim 8, further configured to transmit information indicating any number of layer-2 group IDs,
 wherein the information indicating any number of layer-2 group IDs is received via any of a broadcast message, radio resource control (RRC) signaling, and non-access stratum (NAS) signaling,
 wherein the information indicating any number of layer-2 group IDs is received from any of a base station, a mobility management entity (MME), a group application server, and a proximity services (ProSE) server, and
 wherein the information indicating any number of layer-2 group IDs is associated with a group application layer associated with the group application server.

10. The remote WTRU of claim 9, further configured to use any of different pre-emption vulnerabilities and different pre-emption capabilities for each of a group communication bearer and a non-group communication bearer according to first and second priority levels.

11. The remote WTRU of claim 9, further configured to receive information indicating a group application layer ID from any of the BS, the MME, a group application server, and the ProSE server, wherein the any number of layer-2 group IDs map to the group application layer ID.

12. The remote WTRU of claim 8, further configured to:
use a group communication bearer having a first priority level associated with allocating resources to the group communication bearer for group communications; and
use a non-group communication bearer having a second priority level associated with allocating resources to the non-group communication bearer,
wherein the second priority level is different from the first priority level.

13. The remote WTRU of claim 12, further configured to use different Quality Control Indexes (QCIs) for each of the group communication bearer and the non-group communication bearer according to the first and second priority levels for any of downlink traffic and unicast traffic.

14. A relay wireless transmit receive unit (WTRU) for group communications of a group of WTRUs including a relayed WTRU, the relay WTRU comprising circuity including a transmitter, a receiver, a processor and memory, configured to:
transmit, to the relayed WTRU, relay discovery information including information indicating: (1) an announcer of relay services, (2) one or more temporary mobile group identities (TMGIs) associated with the relay WTRU, and (3) a network identifier (ID) for the group communications for the group of WTRUs;
receive, from the relayed WTRU, relay monitoring information including information indicating one or more of the TMGIs for which the relayed WTRU requests monitoring by the relay WTRU; and
transmit the group communications associated with the indicated one or more TMGIs associated with the relay WTRU, wherein the group communications are received from a base station (BS) and transmitted to the relayed WTRU.

15. The relay WTRU of claim 14, further configured to receive information indicating any number of layer-2 group IDs via any of a broadcast message, radio resource control (RRC) signaling, and non-access stratum (NAS) signaling,
wherein the information indicating any number of layer-2 group IDs is received from any of a base station, a mobility management entity (MME), a group application server, and a proximity services (ProSE) server.

16. The relay WTRU of claim 15, wherein the information indicating any number of layer-2 group IDs is associated with a group application layer associated with the group application server.

17. The relay WTRU of claim 15, further configured to transmit information indicating the group application layer ID to any one of the BS, the MME, a group application server, and the ProSE server, wherein the any number of layer-2 group IDs map to a group application layer ID.

18. The relay WTRU of claim 14, further configured to:
use a group communication bearer having a first priority level associated with allocating resources to the group communication bearer for providing group communications; and
use a non-group communication bearer having a second priority level associated with allocating resources to the non-group communication bearer, wherein the second priority level is different from the first priority level.

19. The relay WTRU of claim 18, further configured to associate different Quality Control Indexes (QCIs) to the group communication bearer and the non-group communication bearer according to the first and second priority levels any of downlink traffic and unicast traffic.

20. The relay WTRU of claim 19, further configured to associate any of different pre-emption vulnerabilities and different pre-emption capabilities to each of the group communication bearer and the non-group communication bearer according to the first and second priority levels.